US008558913B2

(12) United States Patent
Pillman et al.

(10) Patent No.: US 8,558,913 B2
(45) Date of Patent: Oct. 15, 2013

(54) CAPTURE CONDITION SELECTION FROM BRIGHTNESS AND MOTION

(75) Inventors: Bruce H. Pillman, Rochester, NY (US);
John N. Border, Walworth, NY (US);
Ann M. Taccardi, Pittsford, NY (US)

(73) Assignee: Apple Inc., Cupertino, CA (US)

( * ) Notice: Subject to any disclaimer, the term of this patent is extended or adjusted under 35 U.S.C. 154(b) by 533 days.

(21) Appl. No.: 12/701,659

(22) Filed: Feb. 8, 2010

(65) Prior Publication Data
US 2011/0193990 A1     Aug. 11, 2011

(51) Int. Cl.
*H04N 5/235* (2006.01)

(52) U.S. Cl.
USPC ........................................ 348/229.1; 348/362

(58) Field of Classification Search
USPC ............... 348/229.1, 207.99, 208.99–208.16, 348/222.1, 230.1, 241, 362–368; 396/13, 396/52–55, 153
See application file for complete search history.

(56) References Cited

U.S. PATENT DOCUMENTS

| | | | |
|---|---|---|---|
| 3,971,065 A | 7/1976 | Bayer | |
| 4,887,121 A | 12/1989 | Pritchard | |
| 5,335,041 A | 8/1994 | Fox | |
| 5,488,674 A | 1/1996 | Burt | |
| 6,301,440 B1 | 10/2001 | Bolle | |
| 6,429,895 B1 | 8/2002 | Onuki | |
| 7,084,910 B2 | 8/2006 | Amerson | |
| 7,092,019 B1 | 8/2006 | Ogata | |
| 7,602,418 B2 | 10/2009 | Border | |
| 7,852,374 B2 | 12/2010 | Kaneko | |
| 2002/0149693 A1 | 10/2002 | Tantalo | |
| 2003/0007076 A1 | 1/2003 | Okisu | |
| 2004/0239771 A1* | 12/2004 | Habe | 348/208.12 |
| 2004/0239779 A1 | 12/2004 | Washisu | |
| 2005/0128343 A1* | 6/2005 | Murata et al. | 348/362 |
| 2005/0207342 A1 | 9/2005 | Tanabe | |
| 2006/0007341 A1 | 1/2006 | Nakamura | |
| 2006/0098112 A1 | 5/2006 | Kelly | |
| 2006/0152596 A1 | 7/2006 | Adams | |
| 2006/0170816 A1* | 8/2006 | Silverstein et al. | 348/362 |
| 2006/0187324 A1* | 8/2006 | Lin | 348/241 |

(Continued)

FOREIGN PATENT DOCUMENTS

| | | |
|---|---|---|
| EP | 1538562 | 6/2005 |
| WO | 2006082186 | 8/2006 |
| WO | 2007/017835 | 2/2007 |

OTHER PUBLICATIONS

Bruce Pillman: "Camera Exposure Determination Based on a Psychometric quality Model", Signal Processing Systems (SIPS) 2010 IEEE Workshop on, Oct. 6, 2010-Oct. 8, 2010, pp. 339-344, XP002670115, ISSN: 1520-6130 Paragraph [0005]; figure 8.

(Continued)

*Primary Examiner* — Nelson D. Hernández Hernández
*Assistant Examiner* — Dennis Hogue
(74) *Attorney, Agent, or Firm* — Wong, Cabello, Lutsch, Rutherford & Brucculeri LLP

(57) ABSTRACT

A model based method for capturing an improved archival image, including capturing at least two preview images of a scene that are analyzed for scene brightness and motion velocity in the scene. The analyzed data is used to calculate a ratio of pixel signal rate/pixel velocity which is used to select a capture mode, an ISO and an exposure time for capturing the archival image.

19 Claims, 15 Drawing Sheets

(56) References Cited

U.S. PATENT DOCUMENTS

| | | |
|---|---|---|
| 2006/0724156 | 12/2006 | Rabbani et al. |
| 2007/0046807 A1 | 3/2007 | Hamilton |
| 2007/0092244 A1* | 4/2007 | Pertsel et al. ............ 396/153 |
| 2007/0210244 A1 | 9/2007 | Halvis |
| 2007/0212045 A1 | 9/2007 | Yamasaki |
| 2007/0216776 A1* | 9/2007 | Woolfe ............ 348/222.1 |
| 2007/0237506 A1 | 10/2007 | Minema et al. |
| 2007/0237514 A1* | 10/2007 | Pillman et al. ............ 396/153 |
| 2007/0248330 A1 | 10/2007 | Pillman |
| 2008/0094498 A1 | 4/2008 | Mori |
| 2008/0101786 A1 | 5/2008 | Pozniansky et al. |
| 2009/0040364 A1 | 2/2009 | Rubner |
| 2009/0115856 A1* | 5/2009 | Washisu ............ 348/208.1 |
| 2009/0244301 A1* | 10/2009 | Border et al. ............ 348/208.99 |
| 2010/0066842 A1 | 3/2010 | Narasimha |
| 2010/0208087 A1 | 8/2010 | Ogawa |

OTHER PUBLICATIONS

ISO 20462 A Psychophysical Image Quality Measurement Standard, in Image Quality and System Performance, edited by Yoichi Miyake & d. Rene Rasmussen, Proceedings of SPIE-IS&T electronic Imaging, vol. 5294 (2004), pp. 181-189.

International Search Report and Written Opinion received in corresponding PCT Application No. PCT/US2011/023360, dated Nov. 11, 2011.

Computer Vision Laboratory homepage, www1.cs.columbia.edu/CAVE/, printed out on Jun. 24, 2013.

* cited by examiner

| R | G | R | G |
|---|---|---|---|
| G | B | G | B |
| R | G | R | G |
| G | B | G | B |

FIG. 12

CAPTURE CONDITION SELECTION FROM BRIGHTNESS AND MOTION

CROSS-REFERENCE TO RELATED APPLICATIONS

Reference is made to U.S. patent application Ser. No. 12/060,520, filed Apr. 1, 2008 entitled "Controlling Multiple-Image Capture" by John N. Border et al., the disclosure of which is incorporated herein.

FIELD OF THE INVENTION

The present invention relates to electronic image capture devices and the control of the image capture device to provide improved image quality in a single captured image when motion is present.

BACKGROUND OF THE INVENTION

An electronic imaging system depends on a lens system to form an image on an image sensor to create an electronic representation of a visual image. Examples of such image sensors include charge coupled device (CCD) image sensors and active pixel sensor (APS) devices (APS devices are often referred to as CMOS sensors because of the ability to fabricate them in a Complementary Metal Oxide Semiconductor process). A sensor includes a two-dimensional array of individual picture element sensors, or pixels. Each pixel is typically provided with either a red, green, or blue filter, as for example described by Bayer in U.S. Pat. No. 3,971,065 issued Jul. 20, 1976, so that a full color image can be produced. Regardless of the type of image sensor employed, e.g., CCD or CMOS, the pixel acts as a bucket in which photo-generated charge is accumulated in direct proportion to the amount of light that strikes the pixel during the capture of an image by the electronic imaging system.

The image sensor gathers light for an interval of time called the exposure time or integration time to make a correct exposure during image capture. Based on brightness measurements of the scene to be imaged, the electronic imaging system, typically with an autoexposure system, is employed to determine a suitable exposure time that will yield an image with effective brightness and an effective signal to noise ratio. The dimmer the scene, the larger the amount of time the electronic imaging system must use to gather light to make a correct exposure. If motion relative to the image capture device is present during image capture, motion blur can be present in the captured image as the motion velocity increases relative to the exposure time. There are two types of motion blur: global motion blur and local motion blur. Global motion blur is produced when the image capture device is moving relative to the scene during capture and as such the entire image is blurred. Methods to reduce global motion blur are well known to those in the field. One method is to use an inertial measurement device (typically a gyro) to measure the motion of the image capture device during capture and then use a special lens with a lens element that can be moved laterally to cause the image formed by the lens on the image sensor to move in a direction that compensates for the image capture device motion. A second method is described in U.S. Patent Publication No. 2006/0274156, based on a digital shifting of images to compensate for movement of the digital camera during video captures to reduce global motion blur and to stabilize the images in the video. However, neither of these methods address local motion blur produced within the scene.

One method to reduce local motion blur is to shorten the exposure time. This method reduces the exposure time to something less than the exposure time selected by the autoexposure system; as a result, darker images with a low signal to noise ratio are captured. An analog or digital gain can then be applied to the pixel values in the image to brighten the darker images, but those skilled in the art will recognize that this will result in noisier images.

Another method to reduce local motion blur is to gather more light with a larger aperture lens and larger pixels on the image sensor, enabling a shorter exposure time. This method can produce images with reduced local motion blur and acceptable noise levels. However, the current industry trend in electronic imaging systems is to make image capture devices more compact and less expensive. High-grade optical elements with large apertures and image sensors with larger pixels, which can gather more light, are therefore not practical.

Another method to reduce local motion blur is to shorten the exposure time and supplement the available light with a photographic flash. A photographic flash produces a strong light flux that is sustained for a fraction of a second with the exposure time set to encompass the flash time. The exposure time can be set to a significantly shorter time interval than without a flash since the photographic flash is very bright. Therefore, the blur caused by local motion during the exposure is reduced. However, flashes are not effective in bright lighting and fast moving objects in bright lighting can still produce local motion blur. In addition, flash photography is typically only useful if the distance between the flash and the scene being photographed is small. Flash photography also tends to produce artifacts such as red eyes and very bright areas or dark areas, which many people find objectionable.

Conventional solutions for selecting exposure time typically use one or more standardized settings, or respond to operator mode settings to obtain an exposure time. FIG. 2A shows a flow chart of a typical camera control system 200 for a digital camera as is typically performed in an autoexposure control system. In Step 210, the camera assesses the scene brightness either with a scene brightness sensor or with an analysis of a preview image. In the typical camera control system shown in FIG. 2A, motion is not measured or taken into account. In Step 220, the capture mode is determined based on the scene brightness and any operator settings or standardized settings. In Step 230, the ISO is determined in accordance with the scene brightness and the capture mode. The exposure time is then determined in Step 240 in accordance with the scene brightness, the capture mode and the ISO. In Step 250, a final archival image is captured and stored. However, the method of the typical camera control system 200 can capture images with poor perceived image quality because the degree of brightness and motion in the scene can be highly variable and since motion is not taken into account, disappointing levels of motion blur or noise can be present in the images.

In US Patent Publication 2007/0237514, motion in the scene is measured prior to image capture. If slow motion is detected, then additional analysis is done to help select a scene mode for the camera. If rapid motion is detected, then a set of standardized camera settings is used as determined by the autoexposure control system and the operator selectable camera settings as presented in FIG. 2A. As such, the method of 2007/0237514 only provides an improved method for capture of scenes with slow motion.

In US Patent Publication 2007/0237506, a camera is described wherein an image is captured at a slower shutter speed if no camera motion is detected. If camera motion is detected, then an image is captured at a faster shutter speed. While this method does reduce motion blur in images, it does not address the combined effects of motion blur and noise in the image on the perceived image quality of the image in selecting capture conditions including exposure time and ISO. The method of 2007/0237506, also does not include the selection of capture conditions based on local motion.

FIG. 2B shows a flow chart 290 of the PRIOR ART described in WO2007017835 for a method of control of a multiple image capture process. In Step 270 a first image is captured using exposure conditions defined by the camera autoexposure control system as presented in FIG. 2A. In Step 275, the first image is then analyzed for aspects of image quality such as overexposure or underexposure, motion blur, dynamic range or depth of field to determine which aspects have been met and where deficiencies remain. Based on this analysis, Step 280 is a check on whether deficiencies remain in the aspects of image quality. If some deficiencies remain in the aspects of image quality, the process proceeds to Step 282 where new exposure parameters are set for at least one additional image. The process then loops back to Step 272 where at least one additional image is captured using the new exposure parameters. The additional image is then analyzed in Step 275 for aspects of image quality. This process repeats until all the aspects of image quality have been met amongst the multiple images that have been captured. A final image is then constructed from portions of the multiple images that are combined in Step 285 in such a way that all the aspects of image quality desired are met. However, the method of WO2007017835 is directed at the control of multiple image capture photography where portions of multiple images are combined to produce an improved image and does not address motion related issues in a single captured image.

Thus, there is a need for an automated method for selecting capture conditions to improve perceived image quality in a single captured image when global motion or local motion is present in the scene being imaged.

SUMMARY OF THE INVENTION

The invention described herein provides a method for capturing an archival image with an image capture device and automatically selecting settings for the image capture device based on measured scene brightness and measured motion velocity in the scene in the form of a signal ratio. The invention provides methods at least partially implemented with a data processing system that measures brightness and motion in the scene and selects capture mode and capture conditions to capture an image with improved perceived image quality based on a multi-dimensional model.

In first embodiments, the invention comprises; using an image capture device with selectable capture modes, ISO and exposure time for capturing at least two preview images of a scene; analyzing the preview images for scene brightness and motion in the scene; determining a pixel signal rate based on scene brightness in an image; determining a pixel velocity based on the motion in the scene; determining a signal ratio which is the pixel signal rate/pixel velocity; selecting the capture mode in accordance with the signal ratio; selecting the ISO in accordance with the capture mode and the signal ratio; selecting the exposure time in accordance with the ISO and scene brightness; and capturing an archival image with the selected capture mode, ISO and exposure time and causing the storage of the archival image into a memory. Wherein selecting the capture mode can include selecting the binning ratio for the image sensor or selecting a single image capture mode or a multiple image capture mode.

In a further embodiment of the invention, local pixel velocities are determined for different regions in the image when local motion is present in the scene. In one embodiment of the invention, the signal ratio is determined based on an analysis of the distribution of local pixel velocities for the different regions of the image. In another embodiment of the invention, the signal ratio is determined based on an average local pixel velocity. In a further embodiment of the invention, the signal ratio is determined based on a peak or maximum local pixel velocity.

In yet another embodiment of the invention, an inertial measurement device is provided in the image capture device and the inertial measurement device is used to determine the pixel velocity. In this embodiment, the scene brightness that is used to determine the pixel signal rate is determined from an analysis of one or more preview images or from data collected from a brightness sensor. The determined pixel velocity and pixel signal rate are used to determine the signal ratio which is used as described previously.

In a still further embodiment of the invention, the inertial measurement device is used to determine the global motion present while an analysis of two or more preview images is used in conjunction with the determined global motion from the inertial measurement device to determine the local motion present.

Image capture in accordance with the present invention is particularly suitable for image capture devices that capture still and video images when local motion is present in the scene, or global motion is present due to the image capture device moving relative to the scene. The present invention has broad application with image capture devices and numerous types of image capture devices can effectively use these image capture methods due to the method of combined selection of capture mode, ISO and exposure time based on measured brightness and measured motion to capture an image with improved perceived image quality.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 12 is a diagram of a Bayer color filter array;

DETAILED DESCRIPTION OF THE INVENTION

Figure 1:
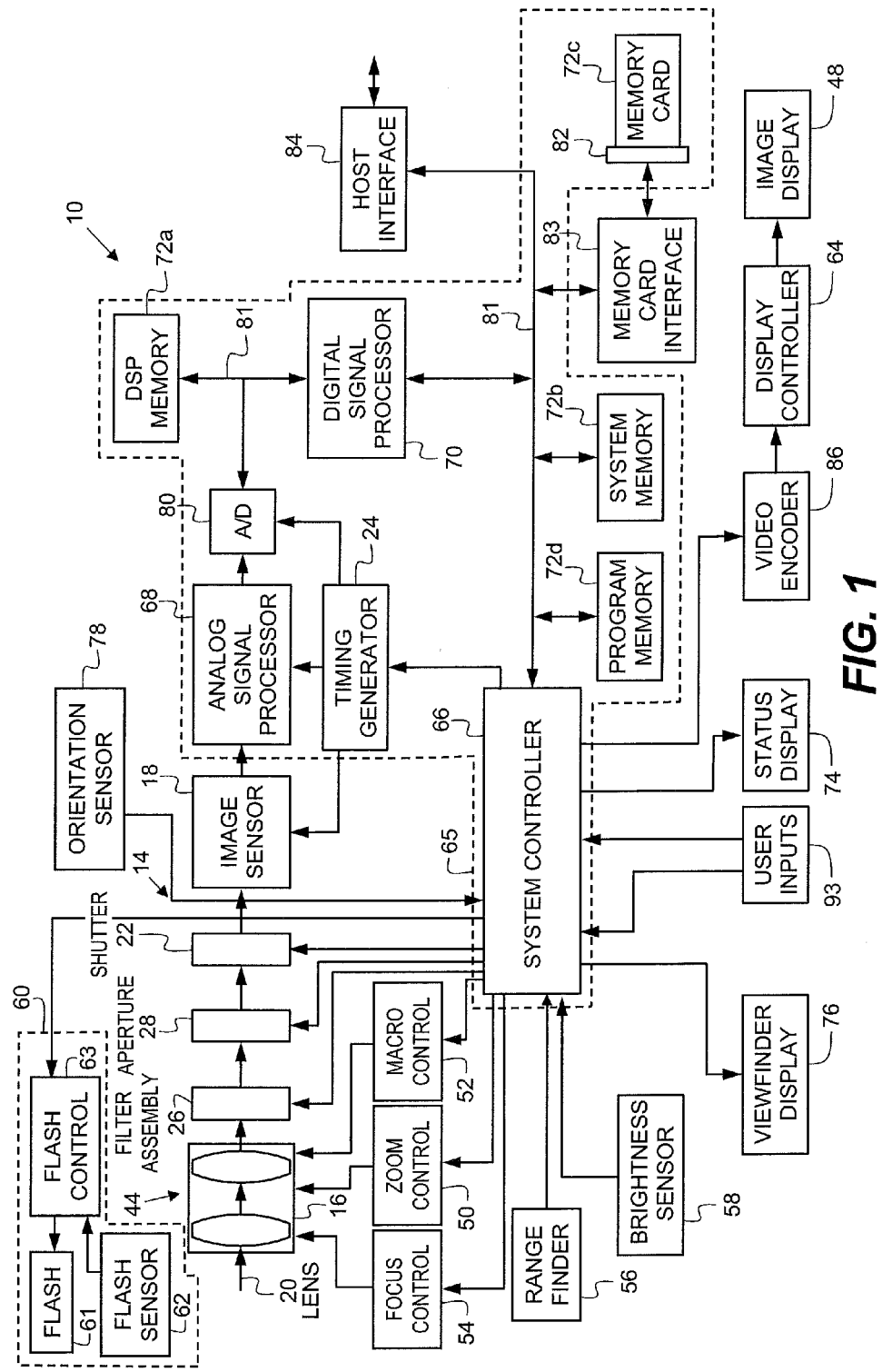
FIG. 1 is a block diagram of an image capture device.
Figure 2A:
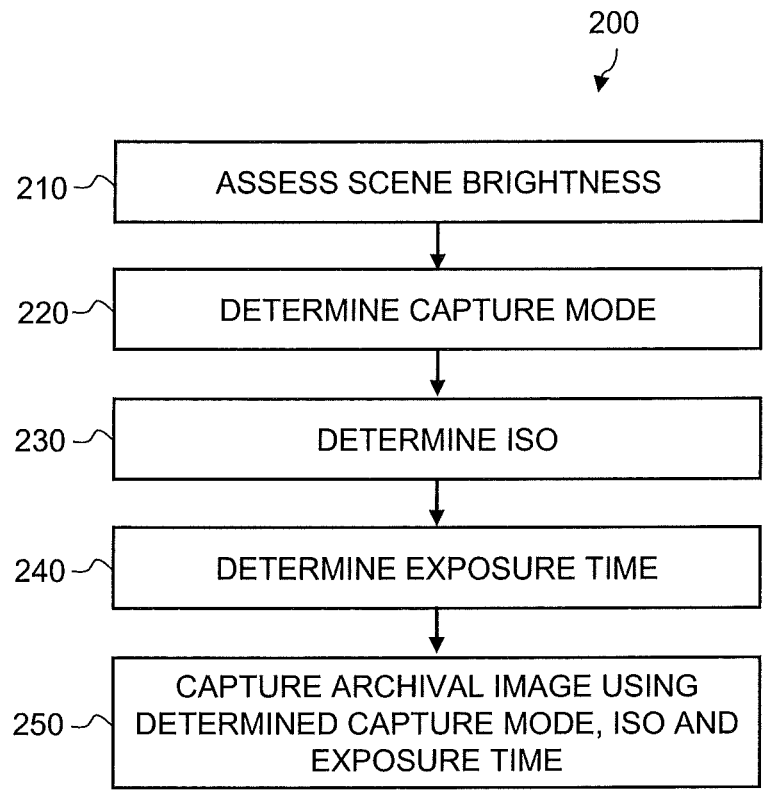
FIG. 2A is a flow chart of a typical PRIOR ART camera control system.
Figure 2B:
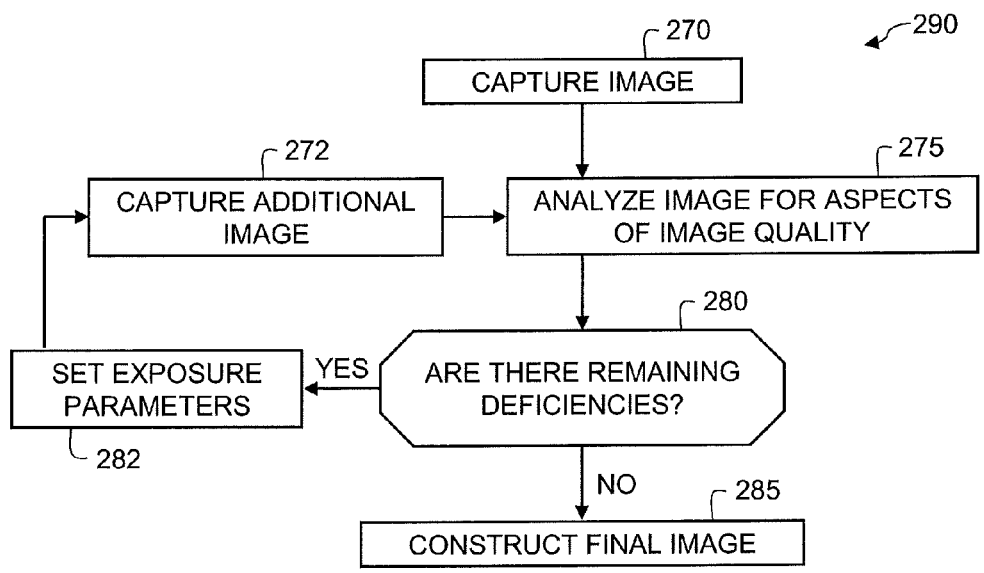
FIG. 2B is a flow chart of a PRIOR ART method for capturing multiple images.

Referring to FIG. 1, in a particular embodiment, the components of a digital image capture device 10 are shown wherein the components are arranged in a body that provides structural support and protection. The body can be varied to meet requirements of a particular use and style considerations. An electronic image capture unit 14, which is mounted in the body of the digital image capture device 10, has a taking lens 16 and an image sensor 18 aligned with the taking lens 16. Light from a scene propagates along an optical path 20 through the taking lens 16 and strikes the image sensor 18 producing an analog electronic image.

The type of image sensor used can vary, but it is highly preferred that the image sensor be one of the several solid-state image sensors available. For example, the image sensor can be a charge-coupled device (CCD), a CMOS sensor (CMOS), or charge injection device (CID). The electronic image capture unit 14 includes other components associated with the image sensor 18. A typical image sensor 18 is accompanied by separate components that act as clock drivers (also referred to herein as a timing generator), analog signal processor (ASP) and analog-to-digital converter/amplifier (A/D converter). Such components can also be incorporated into a single unit with the image sensor 18. For example, CMOS image sensors are manufactured with a process that allows other components to be integrated onto the same semiconductor die.

The electronic image capture unit 14 captures an image with three or more color channels. It is currently preferred that a single image sensor 18 be used along with a color filter array, however, multiple image sensors and different types of filters can be used. Suitable filters are well known to those of skill in the art, and, in some cases are incorporated with the image sensor 18 to provide an integral component.

The electrical signal from each pixel of the image sensor 18 is related to both the intensity of the light reaching the pixel and the length of time the pixel is allowed to accumulate or integrate the signal from incoming light. This time is called the integration time or exposure time.

Integration time is controlled by a shutter 22 that is switchable between an open state and a closed state. The shutter 22 can be mechanical, electromechanical or can be provided as a logical function of the hardware and software of the electronic image capture unit 14. For example, some types of image sensors 18 allow the integration time to be controlled electronically by resetting the image sensor 18 and then reading out the image sensor 18 some time later. When using a CCD, electronic control of the integration time of the image sensor 18 can be provided by shifting the accumulated charge under a light shielded register provided in a non-photosensitive region. This light shielded register can be for all the pixels as in a frame transfer device CCD or can be in the form of rows or columns between pixel rows or columns as in an interline transfer device CCD. Suitable devices and procedures are well known to those of skill in the art. Thus, the timing generator 24 can provide a way to control when the integration time occurs for the pixels on the image sensor 18 to capture the image. In the image capture device 10 of FIG. 1, the shutter 22 and the timing generator 24 jointly determine the integration time.

The combination of overall light intensity and integration time is called exposure. Exposure combined with the sensitivity and noise characteristics of the image sensor 18 determine the signal to noise ratio provided in a captured image. Equivalent exposures can be achieved by various combinations of light intensity and integration time. Although the exposures are equivalent, a particular exposure combination of light intensity and integration time can be preferred over other equivalent exposures for capturing an image of a scene based on the characteristics of the scene or the associated signal to noise ratio.

Although FIG. 1 shows several exposure controlling elements, some embodiments cannot include one or more of these elements, or there can be alternative mechanisms for controlling exposure. The image capture device 10 can have alternative features to those illustrated. For example, shutters that also function as diaphragms are well-known to those of skill in the art.

In the illustrated image capture device 10, a filter assembly 26 and aperture 28 modify the light intensity at the image sensor 18. Each can be adjustable. The aperture 28 controls the intensity of light reaching the image sensor 18 using a mechanical diaphragm or adjustable aperture (not shown) to block light in the optical path 20. The size of the aperture can be continuously adjustable, stepped, or otherwise varied. As an alternative, the aperture 28 can be moved into and removed from the optical path 20. Filter assembly 26 can be varied likewise. For example, filter assembly 26 can include a set of different neutral density filters that can be rotated or otherwise moved into the optical path. Other suitable filter assemblies and apertures are well known to those of skill in the art.

The image capture device 10 has an optical system 44 that includes the taking lens 16 and can also include components (not shown) of a viewfinder to help the operator compose the image to be captured. The optical system 44 can take many different forms. For example, the taking lens 16 can be fully separate from an optical viewfinder or can include a digital viewfinder that has an eyepiece provided over an internal display where preview images are continuously shown prior to and after image capture. Wherein, preview images are typically lower resolution images that are captured continuously. The viewfinder lens unit and taking lens 16 can also share one or more components. Details of these and other alternative optical systems are well known to those of skill in the art. For convenience, the optical system 44 is generally discussed hereafter in relation to an embodiment having a digital viewfinder display 76 or an on-camera display 48 that can be used to view preview images of a scene, as is commonly done to compose an image before capture with an image capture device such as a digital camera.

The taking lens 16 can be simple, such as having a single focal length and manual focusing or a fixed focus, but this is not preferred. In the image capture device 10 shown in FIG. 1, the taking lens 16 is a motorized zoom lens in which a lens element or multiple lens elements are driven, relative to other lens elements, by a zoom control 50. This allows the effective focal length of the lens to be changed. Digital zooming (digital enlargement of a digital image) can also be used instead of or in combination with optical zooming. The taking lens 16 can also include lens elements or lens groups (not shown) that can be inserted or removed from the optical path, by a macro control-driver 52 so as to provide a macro (close focus) capability.

The taking lens unit 16 of the camera 10 is also preferably autofocusing. For example, an autofocusing system can provide focusing passive or active autofocus or a combination of the two. Referring to FIG. 1, one of more focus elements (not separately shown) of the taking lens 16 are driven, by a focus control 54 to focus light from a particular distance in the scene onto the image sensor 20. The autofocusing system can operate using preview images with different lens focus settings or the autofocus system can have a range finder 56 that has one or more sensing elements that send a signal to the system controller 66 that is related to the distance from the image capture device 10 to the scene. The system controller 66 does a focus analysis of the preview images or the signal from the rangefinder and then operates focus driver 54 to move the focusable lens element or elements (not separately illustrated) of the taking lens 16. Autofocusing methods are well known in the art.

The image capture device 10 includes a measure of the brightness of the scene. The brightness measurement can be done by analyzing the pixel code values in preview images or through the use of a brightness sensor 58. In FIG. 1, a brightness sensor 58 is shown as one or more separate components. The brightness sensor 58 can also be provided as a logical function of hardware and software of the electronic image capture unit 14. The brightness sensor 58 can be used to provide one or more signals representing scene light intensity of the scene for use in the selection of exposure for one or more image sensors 18. As an option, the signal from the brightness sensor 58 can also provide color balance information. An example, of a suitable brightness sensor 58 that can be used to provide one or both of scene illumination and color value and is separate from the electronic image capture unit 14, is disclosed in U.S. Pat. No. 4,887,121.

The exposure can be determined by an autoexposure control. The autoexposure control can be implemented within the system controller 66 and can be selected from those known in the art, an example of which is disclosed in U.S. Pat. No. 5,335,041 issued Aug. 2, 1994. Based on brightness measurements of a scene to be imaged either as provided by a brightness sensor 58 or as provided by measurements from pixel values in preview images, the electronic imaging system typically employs autoexposure control processing to determine an effective exposure time, $t_e$, that will yield an image with effective brightness and good signal to noise ratio. In the present invention, the exposure time, determined by the autoexposure control $t_e$, is used for capture of the preview images and then modified for the capture of an archival image capture based on scene brightness and anticipated motion blur. Where the archival image is the final image that is captured after the capture conditions (including exposure time) have been defined based on the method of the invention. One skilled in the art will recognize that the shorter the exposure time, the less motion blur and more noise will be present in the archival image.

The image capture device 10 of FIG. 1 includes a flash unit 60, which has an electronically controlled illuminator such as a xenon flash tube 61 (labeled "FLASH" in FIG. 1). A flash sensor 62 can optionally be provided, which outputs a signal responsive to the light sensed from the scene during archival image capture or by way of a preflash prior to archival image capture. The flash sensor signal is used in controlling the output of the flash unit by a dedicated flash controller 63 or as a function of the control unit 65. Alternatively, flash output can be fixed or varied based upon other information, such as focus distance. The function of flash sensor 62 and brightness sensor 58 can be combined in a single component or logical function of the capture unit and control unit.

Figure 12:
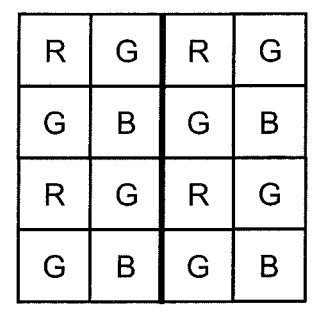

The image sensor 18 receives an image of the scene as provided by the lens 16 and converts the image to an analog electronic image. The electronic image sensor 18 is operated by an image sensor driver. The image sensor 18 can be operated in a variety of capture modes including various binning arrangements. The binning arrangement determines whether pixels are used to collect photo-electrically generated charge individually, thereby operating at full resolution during capture, or electrically connected together with adjacent pixels thereby operating at a lower resolution during capture. The binning ratio describes the number of pixels that are electrically connected together during capture. A higher binning ratio indicates more pixels are electrically connected together during capture to correspondingly increase the sensitivity of the binned pixels and decrease the resolution of the image sensor. Typical binning ratios include 2×, 3×, 6× and 9× for example. The distribution of the adjacent pixels that are binned together in a binning pattern can vary as well. FIG. 12 shows the well known Bayer color filter array pattern where the R, G and B letters indicate the red, green and blue pixels respectively. Typically adjacent pixels of like colors are binned together to keep the color information consistent as provided by the image sensor. The invention can be equally applied to image capture devices with other types of image sensors with other color filter array patterns and other binning patterns.

The control unit 65 controls or adjusts the exposure regulating elements and other camera components, facilitates transfer of images and other signals, and performs processing related to the images. The control unit 65 shown in FIG. 1 includes a system controller 66, timing generator 24, analog signal processor 68, an A/D converter 80, digital signal processor 70, and memory 72a-72d. Suitable components for the control unit 65 are known to those of skill in the art. These components can be provided as enumerated or by a single physical device or by a larger number of separate components. The system controller 66 can take the form of an appropriately configured microcomputer, such as an embedded microprocessor having RAM for data manipulation and general program execution. Modifications of the control unit 65 are practical, such as those described elsewhere herein.

The timing generator 24 supplies control signals for all electronic components in a timing relationship. Calibration values for the individual image capture device 10 are stored in a calibration memory (not separately illustrated), such as an EEPROM, and supplied to the system controller 66. Components of a user interface (discussed below) are connected to the control unit 65 and function by using a combination of software programs executed on the system controller 66. The control unit 65 also operates the various controls and associated drivers and memories, including the zoom control 50, focus control 54, macro control 52, display controller 64 and other controls (not shown) for the shutter 22, aperture 28, filter assembly 26, and viewfinder and status displays 76, 74 respectively.

The image capture device 10 can include other components to provide information supplemental to captured image information or pre-capture information. An example of such a supplemental information component is the orientation sensor 78 illustrated in FIG. 1. Other examples include a real time clock, inertial measurement sensors, a global positioning system receiver, and a keypad or other entry device for entry of user captions or other information.

It will be understood that the circuits shown and described can be modified in a variety of ways well known to those of skill in the art. It will also be understood that the various features described here in terms of physical circuits can be alternatively provided as firmware or software functions or a combination of the two. Likewise, components illustrated as separate units herein can be conveniently combined or shared. Multiple components can be provided in distributed locations.

The initial electronic image from the image sensor 18 is amplified and converted from analog to digital by the analog signal processor 68 and analog to digital (A/D) converter-amplifier 80 to a digital electronic image, which is then processed in the digital signal processor 70 using DSP memory 72a and stored in system memory 72b or removable memory card 72c. Signal lines, illustrated as a data bus 81, electronically connect the image sensor 18, system controller 66, digital signal processor 70, the image display 48, and other electronic components; and provide a pathway for address and data signals.

"Memory" refers to one or more suitably sized logical units of physical memory provided in semiconductor memory or magnetic memory, or the like. Memory 72a-72d can each be any type of random access memory. For example, memory can be an internal memory, such as a Flash EPROM memory, or alternately a removable memory, such as a Compact Flash card, or a combination of both. Removable memory card 72c can be provided for archival image storage. Removable memory card 72c can be of any type, such as a Compact Flash (CF) or Secure Digital (SD) type card inserted into a socket 82 and connected to the system controller 66 via memory card interface 83. Other types of storage that are utilized include without limitation PC-Cards or MultiMedia Cards (MMC).

The control unit 65, system controller 66 and digital signal processor 70 can be controlled by software stored in the same physical memory that is used for image storage, but it is preferred that the control unit 65, digital signal processor 70 and controller 66 are controlled by firmware stored in dedicated program memory 72d, for example, in a ROM or EPROM firmware memory. Separate dedicated units of memory can also be provided to support other functions. The memory on which captured images are stored can be fixed in the image capture device 10 or removable or a combination of both. The type of memory used and the manner of information storage, such as optical or magnetic or electronic, is not critical. For example, removable memory can be a floppy disc, a CD, a DVD, a tape cassette, or flash memory card or stick. The removable memory can be utilized for transfer of image records to and from the camera in digital form or those image records can be transmitted as electronic signals.

Digital signal processor 70 is one of two processors or controllers in this embodiment, in addition to system controller 66. Although this partitioning of camera functional control among multiple controllers and processors is typical, these controllers or processors are combined in various ways without affecting the functional operation of the camera and the application of the present invention. These controllers or processors can comprise one or more digital signal processor devices, microcontrollers, programmable logic devices, or other digital logic circuits. Although a combination of such controllers or processors has been described, it should be apparent that one controller or processor can perform all of the needed functions. All of these variations can perform the same function.

In the illustrated embodiment, the control unit 65 and the digital signal processor 70 manipulate the digital image data in the memory 72a according to a software program perma- nently stored in program memory 72d and copied to system memory 72b for execution during image capture. Control unit 65 and digital signal processor 70 execute the software necessary for practicing image processing. The digital image can also be modified in the same manner as in other digital cameras to enhance images. For example, the image can be processed by the digital signal processor 70 to provide interpolation and edge enhancement. Digital processing of an electronic archival image can include modifications related to file transfer, such as, JPEG compression, and file formatting. Metadata can also be provided with the digital image data in a manner well known to those of skill in the art.

System controller 66 controls the overall operation of the image capture device based on a software program stored in program memory 72d, which can include Flash EEPROM or other nonvolatile memory. This memory can also be used to store calibration data, user setting selections and other data which must be preserved when the image capture device is turned off. System controller 66 controls the sequence of image capture by directing the macro control 52, flash control 63, focus control 54, zoom control 50, and other drivers of capture unit components as previously described, directing the timing generator 24 to operate the image sensor 18 and associated elements, and directing the control unit 65 and the digital signal processor 70 to process the captured image data. After an image is captured and processed, the final image file stored in system memory 72b or DSP memory 72a, is transferred to a host computer via host interface 84, stored on a removable memory card 72c or other storage device, and displayed for the user on image display 48. Host interface 84 provides a high-speed connection to a personal computer or other host computer for transfer of image data for display, storage, manipulation or printing. This interface can be an IEEE1394 or USB2.0 serial interface or any other suitable digital interface. The transfer of images, in the method, in digital form can be on physical media or as a transmitted electronic signal.

In the illustrated image capture device 10, processed images are copied to a display buffer in system memory 72b and continuously read out via video encoder 86 to produce a video signal for the preview images. This signal is processed by display controller 64 or digital signal processor 70 and presented on an on-camera image display 48 as the preview images or can be output directly from the image capture device 10 for display on an external monitor. The video images are archival if the image capture device 10 is used for video capture and non-archival if used as the preview images for viewfinding or image composing prior to still archival image capture.

The image capture device 10 has a user interface, which provides outputs to the operator and receives operator inputs. The user interface includes one or more user input controls 93 (labeled "USER INPUTS" in FIG. 1) and image display 48. User input controls can be provided in the form of a combination of buttons, rocker switches, joysticks, rotary dials, touch screens, and the like. User inputs 93 can include a shutter release, a "zoom in/out" control that controls the zooming of the lens units, and other user controls.

The user interface can include one or more displays or indicators to present camera information to the operator, such as exposure level, exposures remaining, battery state, flash state, and the like. The image display 48 can instead or additionally also be used to display non-image information, such as camera settings. For example, a graphical user interface (GUI) can be provided, including menus presenting option selections and review modes for examining captured images. Both the image display 48 and a digital viewfinder display 76 can provide the same functions and one or the other can be eliminated. The image capture device 10 can include a speaker, for presenting audio information associated with a video capture and which can provide audio warnings instead of, or in addition to, visual warnings depicted on the status display 74, image display 48, or both. The components of the user interface are connected to the control unit and functions by using a combination of software programs executed on the system controller 66.

The electronic image is ultimately transmitted to the image display 48, which is operated by a display controller 64. Different types of image display 48 can be used. For example, the image display 48 can be a liquid crystal display ("LCD"), a cathode ray tube display, or an organic electroluminescent display ("OLED"). The image display 48 is preferably mounted on the camera body so as to be readily viewable by the photographer.

As a part of showing an image on the image display 48, the image capture device 10 can modify the image for calibration to the particular display. For example, a transform can be provided that modifies each image to accommodate the different capabilities in terms of gray scale, color gamut, and white point of the display 48 and the image sensor 18 and other components of the electronic capture unit 14. It is preferred that the display 48 is selected so as to permit the entire image to be shown; however, more limited displays can be used. In the latter case, the displaying of the image includes a calibration step that cuts out part of the image, or contrast levels, or some other part of the information in the image.

It will also be understood that the image capture device 10 described herein is not limited to a particular feature set, except as defined by the claims. For example, the image capture device can be a digital camera which can include any of a wide variety of features not discussed in detail herein, such as, detachable and interchangeable lenses. The image capture device 10 can also be portable or fixed in position and can provide one or more other functions related or unrelated to imaging. For example, the image capture device 10 can be a cell phone camera or can provide communication functions in some other manner. Likewise, the image capture device 10 can include computer hardware and computerized equipment. The image capture device 10 can also include multiple capture units.

Figure 3:
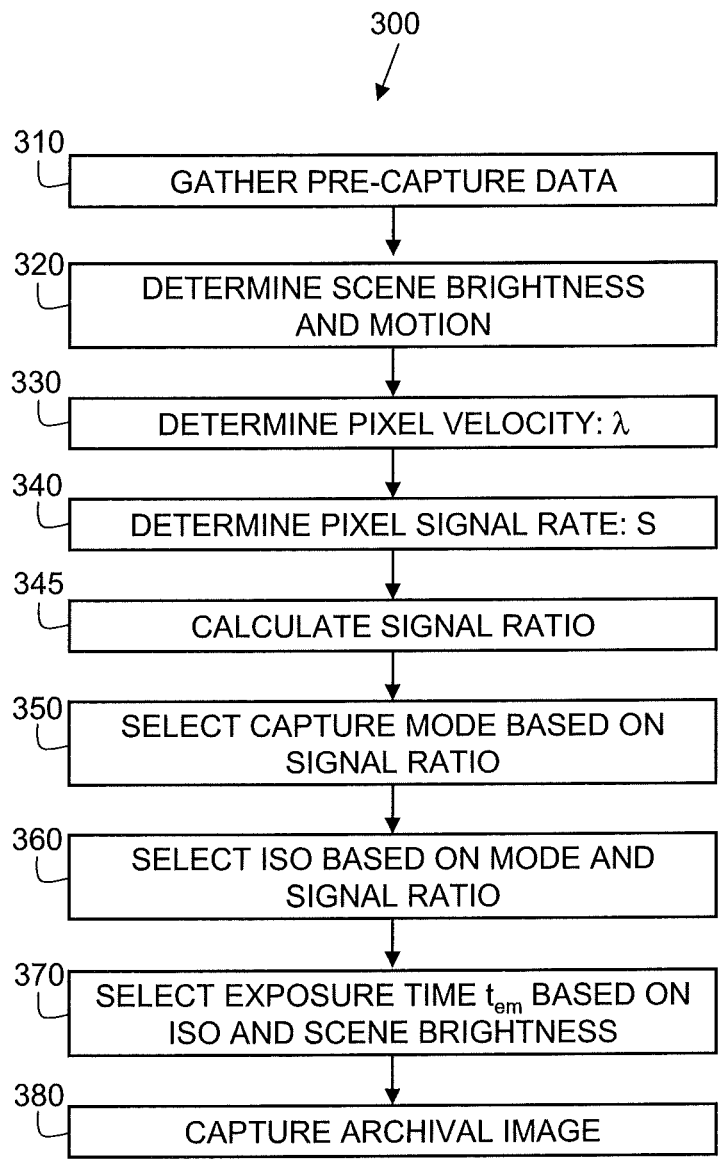
FIG. 3 is a flow chart of an embodiment of the invention.

FIG. 3 shows a flow chart of a first embodiment 300 of the method of the invention which is provided by the control unit 65 or the digital signal processor 70 in FIG. 1. In Step 310, pre-capture data is gathered including: 2 or more preview images, GPS location information, light level information, audio information and focus information. The pre-capture data is then analyzed to determine scene brightness L and motion in Step 320. Wherein the scene brightness L can be determined from a brightness sensor 58 (as shown in FIG. 1) or from the pixel code values in the preview images as compared to the exposure time used to capture the preview images. Motion can be determined, in terms of pixels shifts, by comparing the two or more different preview images to identify differences in the location of corresponding objects in the scene as captured in the preview images. A method for determining motion by comparing video images is described in US Patent Publication 2006/0274156. Both global motion and local motion can be identified from the preview images in this way. Global motion refers to common motion across the image which is typically produced by movement of the image capture device relative to the scene, and local motion refers to movement of objects within the scene. In Step 330, the determined motion in terms of pixel shifts between the preview images is compared to the time between captures of preview images to determine the rate of motion or pixel velocity $\lambda$ in terms of pixels/sec.

In Step 340, the brightness L as determined from the preview images or pre-capture light level information is used, along with the exposure time for the preview images and the signal gain, f/number, and other data such as sensor quantum efficiency and lens transmittance, to determine the overall pixel signal rate S in terms of electrons/sec for each pixel. Those familiar with the art of camera exposure determination will appreciate that pixel signal rate S is affected by factors such as pixel area, sensor quantum efficiency, lens f/number and lens transmittance, as well as scene brightness. In Step 345 the signal ratio (S/$\lambda$) of pixel signal rate/pixel velocity is calculated by the control unit 65 or the digital signal processor 70. The signal ratio is the parameter that is used by the signal processor 70 to select the capture mode and capture conditions in an embodiment of the invention.

In FIG. 3, Step 330 is shown occurring before Step 340. However, it will be recognized that the order of these two steps is unimportant to the invention as the two steps both involve calculating values based on data gathered in Steps 310 and 320. As a result, Step 340 could occur before Step 330 or the two steps could be accomplished simultaneously within the capabilities of the digital signal processor 70.

In scenes where both global motion and local motion are present, the determined pixel velocities will be different for different regions of the image. In embodiments of the invention related to this case, local pixel velocities can be determined in Step 330 for different regions of the image by comparing corresponding regions between the two or more different preview images. The comparison of the preview images can be done block by block (as described in US Patent Publication 2006/0274156). For example, the preview images can be divided into blocks of pixels that are 32 pixels by 32 pixels in size to obtain a sparse sampling of local pixel velocities over the preview images.

In a further embodiment of the invention, for an image capture device which includes an inertial measurement device such as one or more gyros or one or more accelerometers, data related to the movement of the image capture device is obtained from the inertial measurement device in Step 310. The data from the inertial measurement device is then used to determine the global motion associated with movement of the image capture device in Step 320 instead of analyzing the preview images for motion. In this case, one or more preview images are analyzed to determine scene brightness. Alternately scene brightness is determined with a brightness sensor, in which case preview images are not required to be captured with the pre-capture data in Step 310. Data measured by the inertial measurement device is converted from rotational velocity or linear acceleration as measured by a gyro or an accelerometer respectively to a pixel velocity distribution over the entire image in Step 330 based on the angular field of view provided by the lens. In addition, since inertial measurement devices typically output motion data at over 100 Hz, the data from the inertial measurement device can be sampled multiple times over a period of time such as the exposure time for a preview image.

In yet another embodiment of the invention, an analysis of two or more preview images is used in conjunction with data from an inertial measurement device to differentiate between the global motion and the local motion that is present. In this case, data gathered from the inertial measurement device in Step 310 is used to determine the global motion present due to the movement of the image capture device in Step 320. The two or more preview images are then compared as described previously in Step 320 to determine the global and local motion present. In step 330, the global and local motion determined from the preview image comparison is converted into local pixel velocities. The determined global motion from the inertial measurement device is also converted to a local pixel velocity distribution in Step 330 which is then subtracted from the local pixel velocities determined from the comparison of the two or more preview images, so that the remaining local pixel velocity values for the different regions are due to global motion from a moving scene (not produced by movement of the image capture device) and to local motion. In this way, both global motion and local motion are determined in Step 330. As previously stated, for the purpose of the invention, the inertial measurement data is gathered for a period of time that at least partly overlaps the exposure time of the preview images so the motion data that is used to select the capture mode and capture conditions for the archival image is consistent. This method is effective for differentiating between global motion that is due to the movement of the image capture device and global motion that is due to a moving scene, e.g. a large object like a train.

In any of the embodiments of the invention, when a data analysis of the determined motion is performed, it can comprise any type of statistical analysis to select a representative measure of the global motion or local motion to be used in the method of the invention including: average, mean, maximum or minimum.

In a still further embodiment of the invention, when local motion is present in the scene and the determined local pixel velocities are different for different regions of the image, the method of FIG. 3 can be accomplished using an analysis of the distribution of local pixel velocities in Step 330 to select the pixel velocity λ to use in Step 345 when determining the signal ratio. This analysis is provided by the control unit 65 or the digital signal processor 70 in FIG. 1. In a first embodiment of the invention, an average of the local pixel velocities is used as λ in Step 345. This approach will provide a moderate overall reduction in motion blur while providing a moderate increase in noise. This approach can be suited for use where it is desired to produce an image with an overall improved perceived image quality with some local motion blur.

In an alternate embodiment of the invention, the maximum or peak pixel velocity for all the regions of the image is used as λ in Step 345. This approach will provide a more exaggerated reduction in motion blur in all the areas of the image while increasing noise to a greater extent. This approach can be suited for use where it is desired to produce an image with reduced motion blur in the areas of the image with the fastest motion such as the players in a sports image.

When the signal processor 70 selects capture conditions for an image capture device, such as ISO and exposure time, there are tradeoffs in image quality that must be considered when motion is present. ISO refers to the signal (in terms of pixel values) produced by an image sensor in response to a given amount of light and the associated analog or digital gain that is applied to the pixel values when an image is captured as is well known to those skilled in the art. Typically the selection of ISO is also complemented by further selections of image processing parameters including gain and various noise reduction image processing choices where higher ISO is accompanied by greater levels of noise reduction image processing. A long exposure time increases the signal to noise ratio so the resulting image looks bright with low noise, but motion that is present then results in more blur in the image. In this case, any local motion that is present results in locally blurred areas such as when a fast moving car enters the scene, in addition, global motion results in the entire image being blurred such as when the image capture device is bumped during image capture. Shortening the exposure time decreases motion blur but the signal to noise ratio is also decreased so that the resulting image looks dark or noisy. As the lighting conditions in the scene become darker, longer exposure times are required to produce an image with an acceptable signal to noise ratio that is suitably bright and not noisy. Increasing the gain for an image capture increases the brightness of the image but the noise is made more apparent as well, so the image looks noisy. The important point to note is that the tradeoff of motion blur and noise in an image is matter of perception. The invention disclosed herein presents a method for camera control that includes a sliding adjustment of capture mode, ISO and exposure time that takes into account the perception of image quality as impacted by both motion blur and noise in the captured image as represented by the signal ratio.

FIGS. 4-11 present data from studies of image quality, for a large number of images captured with a specific digital camera, as observed by a group of twenty observers and rated for perceived image quality in terms of Just Noticeable Difference units (JNDs). JND's are commonly used in digital imaging to describe changes in perceived image quality. A description of JNDs can be found in the following reference: "ISO 20462, A psychophysical image quality measurement standard," in *Image Quality and System Performance*, edited by Yoichi Miyake and D. René Rasmussen, Proceedings of SPIE-IS&T Electronic Imaging, Vol. 5294 (2004), pp. 181-189. JND units are statistically discernible levels of difference, where a single JND is the smallest quality difference that is consistently detectable by the observers. In the multi-dimensional model that is presented in FIGS. 4-11, quality is expressed in JND units, as compared to an image that is perceived to be of excellent image quality which has a JND level of zero. The quality values shown in the data of FIGS. 4-11 are essentially JND units of image quality degradation from a high quality reference level. JNDs can be defined in a variety of image quality traits including blur and noise.

Figure 4A:
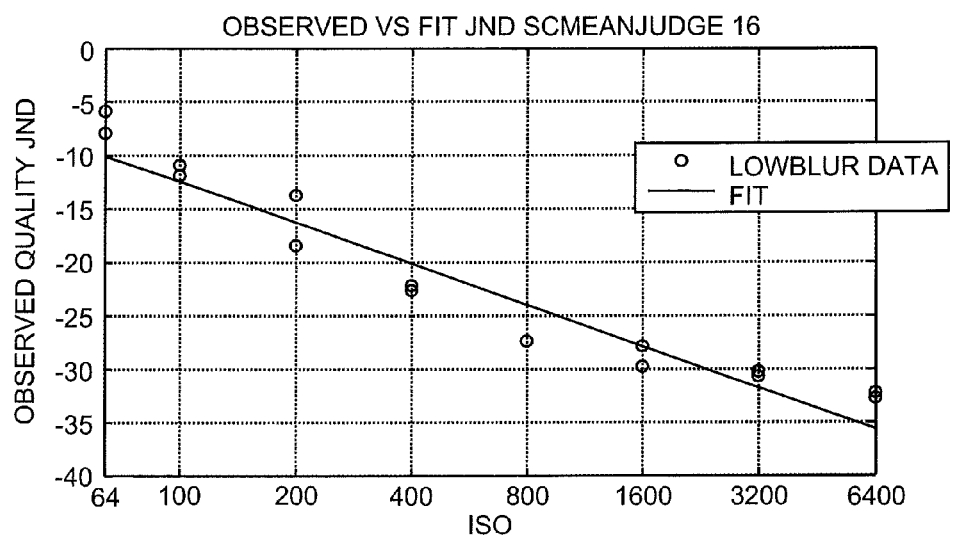
FIG. 4A is a chart showing the relationship between ISO for a low blur image and the perceived image quality.
Figure 4B:
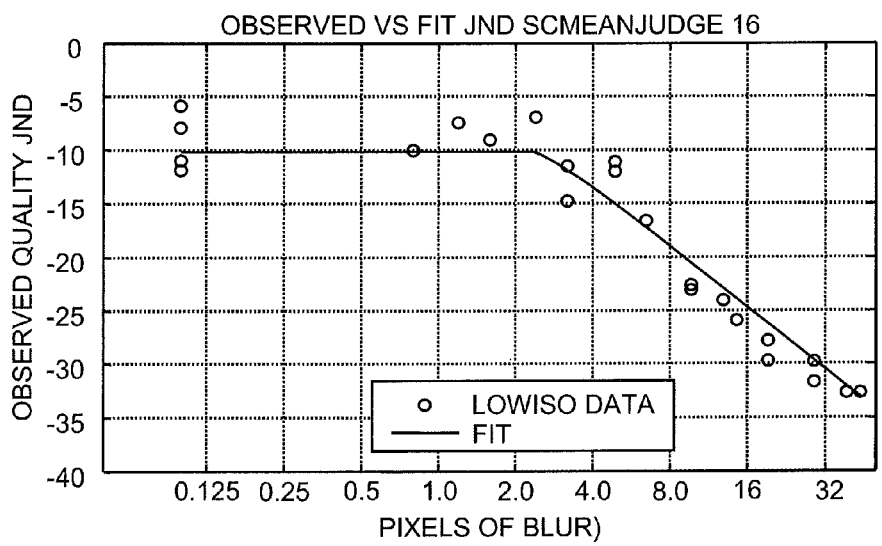
FIG. 4B is a chart showing the relationship between the amount of blur in an image for a low ISO image and the perceived image quality.

FIGS. 4A and 4B show a compilation of perceived image quality as rated by a single observer for a large number of images of the same scene that were captured with controlled amounts of noise and blur produced by different ISO settings and controlled global motion respectively. FIG. 4A shows the data for a series of low blur images with varying amounts of noise as produced by capturing the same scene with different ISO settings on the digital camera. As can be seen from this data, perceived image quality progressively gets worse as the ISO is increased. FIG. 4B shows the data for a series of images captured with a low ISO setting and various amounts of blur produced by controlled motion of the camera during the exposure time. Interestingly enough, the data shows that blur does not have any effect on perceived image quality until it gets above a certain level.

Figure 5:
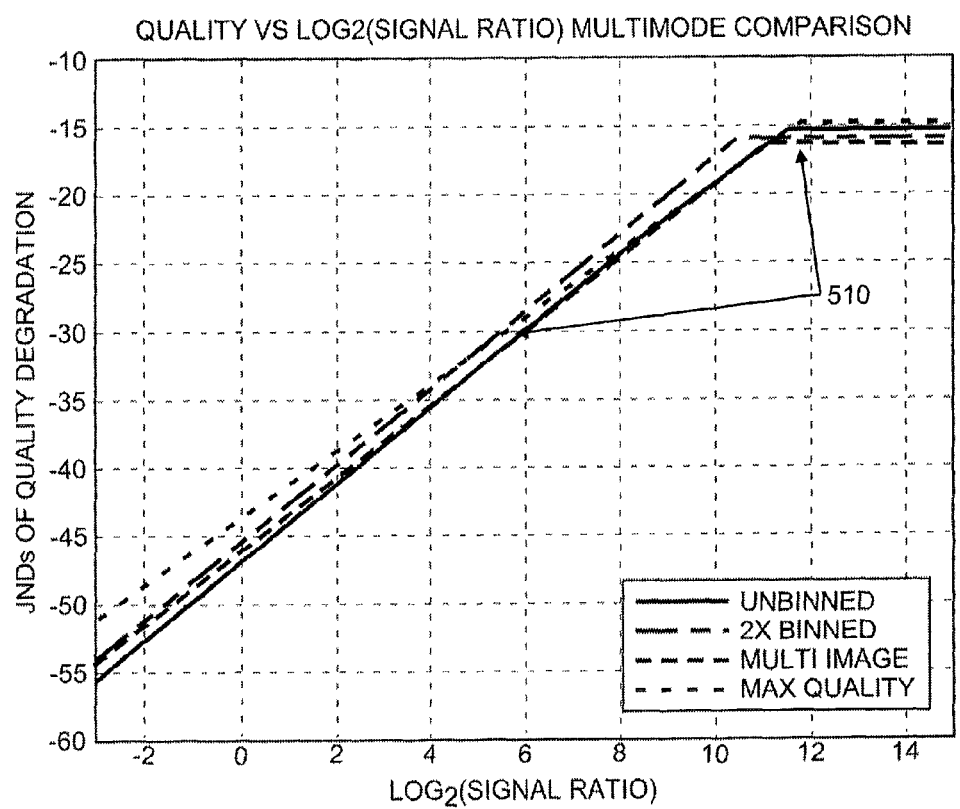
FIG. 5 is a chart showing a relationship between signal ratio and perceived quality for different capture modes.

FIG. 5 shows the relationship between signal ratio (S/λ) and the perceived image quality in terms of JND's for several different capture modes: unbinned (full resolution); 2× binned (half resolution); and a multiple image capture. In a multiple image capture mode, multiple images are captured with a shorter exposure time and then aligned to compensate for motion between the captures and combined to increase the signal to noise ratio as described in co-pending U.S. patent application Ser. No. 12/258,389 for multiple captures using a CMOS image sensor and U.S. patent application Ser. No. 12/184,446 for multiple captures with a CCD image sensor. It is important to recognize that many different capture modes are possible, and the invention includes various modes that provide different temporal resolutions or different spatial resolutions. Different temporal resolutions are provided by capturing over different increments of time as provided by different exposure times or by dividing a desired exposure time into multiple shorter exposure times as in a multiple capture mode. Different spatial resolutions are provided by capturing with different binning ratios.

The chart in FIG. 5 shows the areas of photographic space where different capture modes provide images with higher perceived image quality as a function of signal ratio (S/λ) than other modes for the specific digital camera that was used for the data presented in FIGS. 4-11. While the relationship between perceived image quality and capture modes as shown in FIG. 5 is generally applicable, the relationship can vary between different types of digital cameras or other image capture devices. To provide, high perceived image quality, the invention provides shift points 510 where the camera or image capture device is changed from one mode to another which are determined based on measured signal ratio. The data in FIG. 5 is presented as the perceived level of image quality presented in terms of JND's vs. $Log_2$ (S/λ). As shown by FIG. 5 when the value of S is low or λ is high (S/λ is low), the multiple capture mode provides higher perceived image quality. In a middle value of SIX, a binned capture mode provides higher perceived image quality. When the value of S is high or λ is low (SIX is high), an unbinned (full resolution) capture mode or a multiple capture mode will provide higher perceived image quality.

Figure 6:
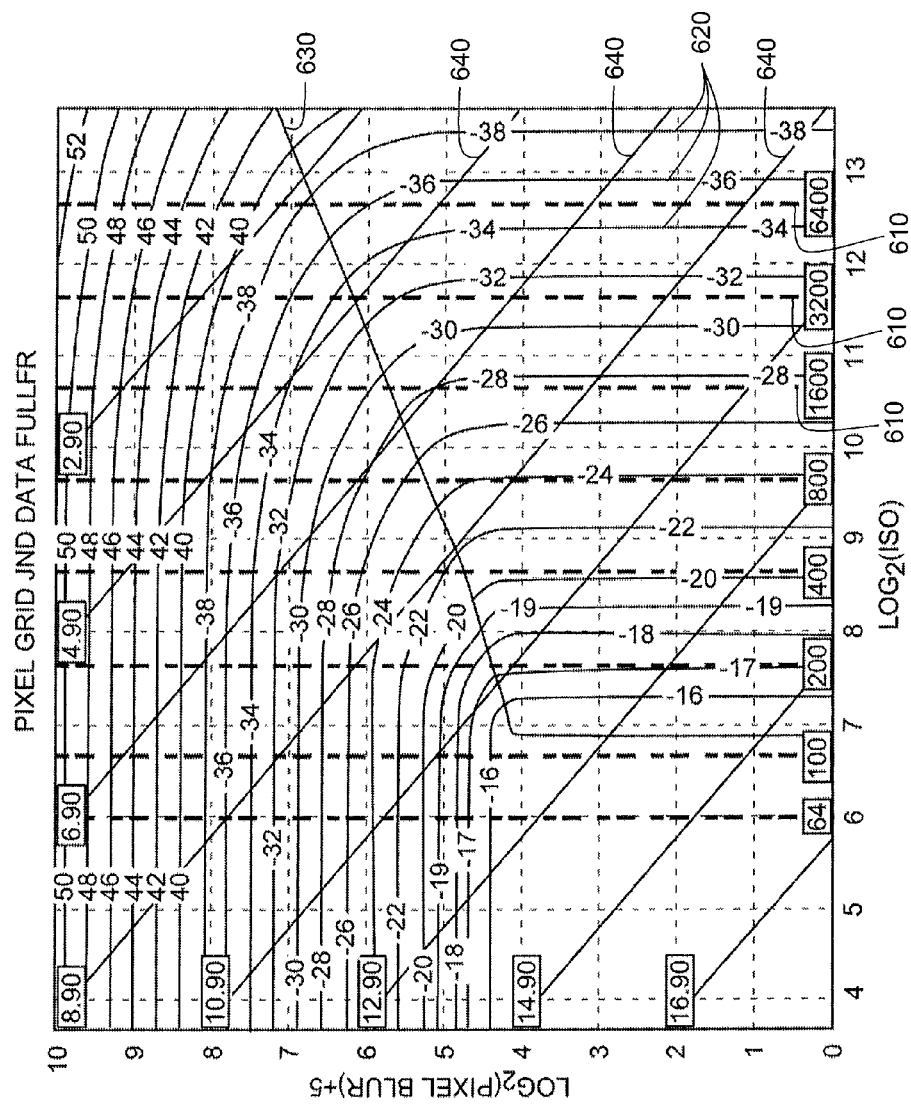
FIG. 6 is a chart showing the effects of ISO and pixel blur on perceived image quality for a full resolution capture mode.

FIG. 6 shows the relationship between ISO, pixel blur, and JNDs of perceived overall image quality based on the combined data presented in FIGS. 4A and 4B. The data in FIG. 6 is presented as $Log_2$ (pixel blur)+5 vs. $Log_2$ (ISO) with vertical dashed ISO lines 610 being shown as well. Pixel blur is the amount of blur in the captured image as described by the product of the pixel velocity λ and the exposure time ($t_e$ or $t_{em}$). Contour lines of constant perceived image quality 620 are shown labeled in terms of JNDs. As can be seen in FIG. 6, the contour lines of constant JND's 620 tend to be vertical when pixel blur is low and horizontal when pixel blur is high. This indicates that at low levels of pixel blur, pixel blur is not very noticeable while noise associated with increasing ISO is very noticeable, so that lines of constant perceived image quality are vertical. In this low blur region of photographic space, it is important to use a longer exposure with a lower ISO setting to reduce noise while allowing some blur (note that ISO cannot be reduced below the base ISO of the image sensor which in this case is 117.2). In contrast, at high levels of pixel blur where constant JND lines are horizontal, pixel blur is very noticeable compared to noise. In this high blur region of photographic space, it is important to use a shorter exposure time with a higher ISO setting to reduce blur while allowing some noise. The selection of ISO and exposure time values are determined by the sloped curve 630 in FIG. 6 to obtain improved perceived image quality throughout the photospace shown.

For reference, FIG. 6 also includes angled lines of constant signal ratio 640. Lines of constant signal ratio represent the quality tradeoff positions available by capturing an image at different ISO values for a given signal ratio. The lines of constant signal ratio 640 are labeled with their respective values of the signal ratio at the left and top of the plot. One significant implication of this figure is that overall image quality does not depend on scene brightness alone, nor does it depend on pixel velocity alone; it depends on both of these values together.

Figure 7:
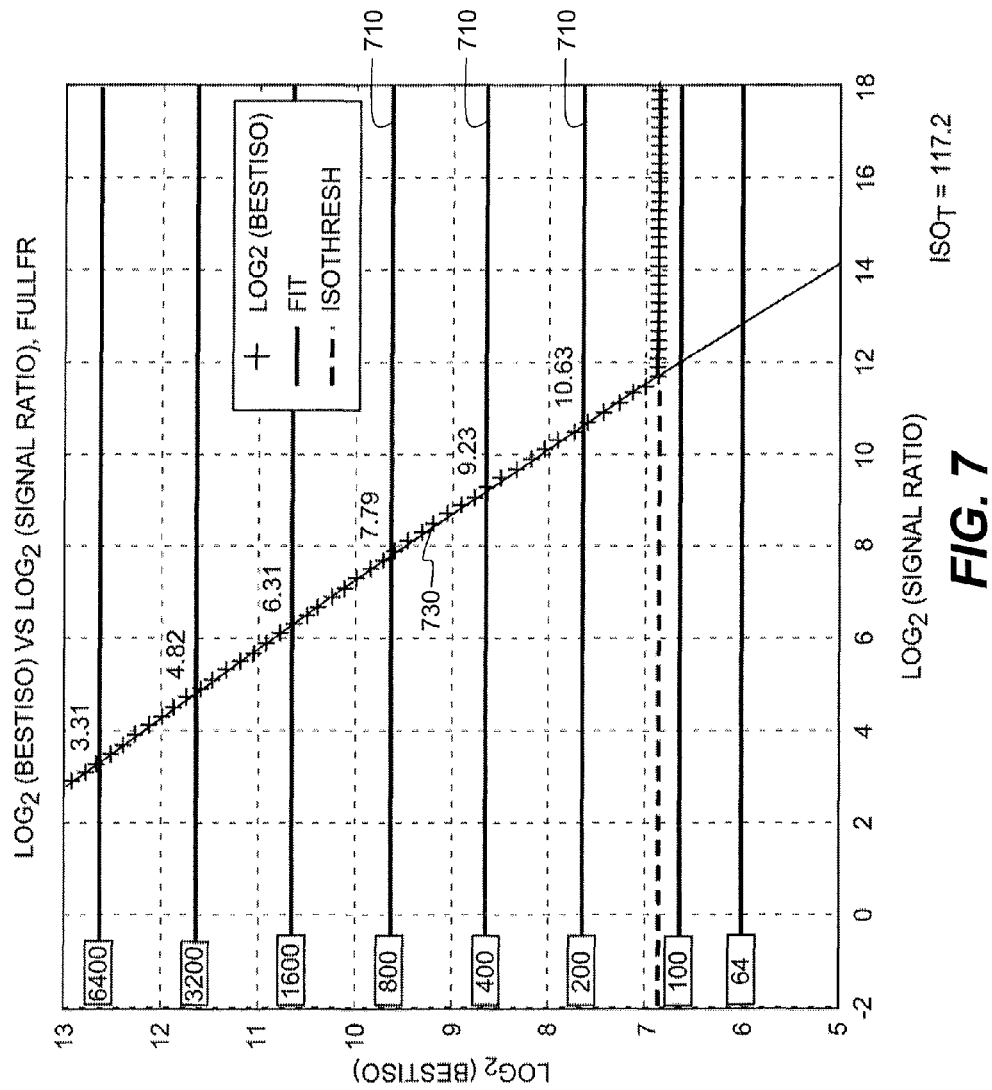
FIG. 7 is a chart showing a relationship between signal ratio and ISO for a full resolution capture mode for improved perceived image quality.

Curve 630 in FIG. 6 shows the preferred combination of ISO and pixel blur for a given signal ratio. For real-time decisions within a capture device, the full quality surface shown by the contours of constant quality is superfluous. The most important relationship in the figure is curve 630. Examining FIG. 6, it can be seen that for a specified signal ratio, improved image quality is obtained by capturing an image with an ISO near curve 630. The combination of signal ratio and ISO determines the pixel blur so the data can be equally presented in terms of ISO and signal ratio. FIG. 7 is a simplification of FIG. 6, showing the data presented in FIG. 6 but in terms of signal ratio and ISO for curve 630 only.

FIG. 7 shows the relationship between signal ratio (S/λ) and ISO to obtain improved perceived image quality using the digital camera that was used in this study in a full resolution capture mode, where the data is presented as $Log_2$ (ISO) vs. $Log_2$ (S/λ). Horizontal lines 710 are shown for different levels of ISO as well in FIG. 7. As indicated by the sloped line 730, as S increases (scene is brighter relative to the motion velocity), the ISO should be lower for improved perceived image quality. This relationship of using lower ISO for brighter scenes is commonly used in the operating systems of digital cameras. However, since the X axis in FIG. 7 is based on S/λ, the sloped line also indicates that as λ increases (more motion) and SIX decreases, the ISO should be higher. The sloped line 730 can be expressed in the form of Eq. 1 below for the digital camera operated in the study.

$$Log_2(ISO) = -0.000445(S/\lambda)^3 + 0.00526(S/\lambda)^2 - 0.6855(S/\lambda) + 14.872 \quad \text{Eq. 1}$$

Those skilled in the art will recognize that ISO can only be reduced down to the base ISO (or saturation-limited ISO) of the image sensor ($ISO_T$), which for the case of the data shown in FIG. 7 is 117.2. As a result, the sloped line 730 shown in FIG. 7 abruptly changes to a horizontal line at ISO=117.2.

Figure 8:
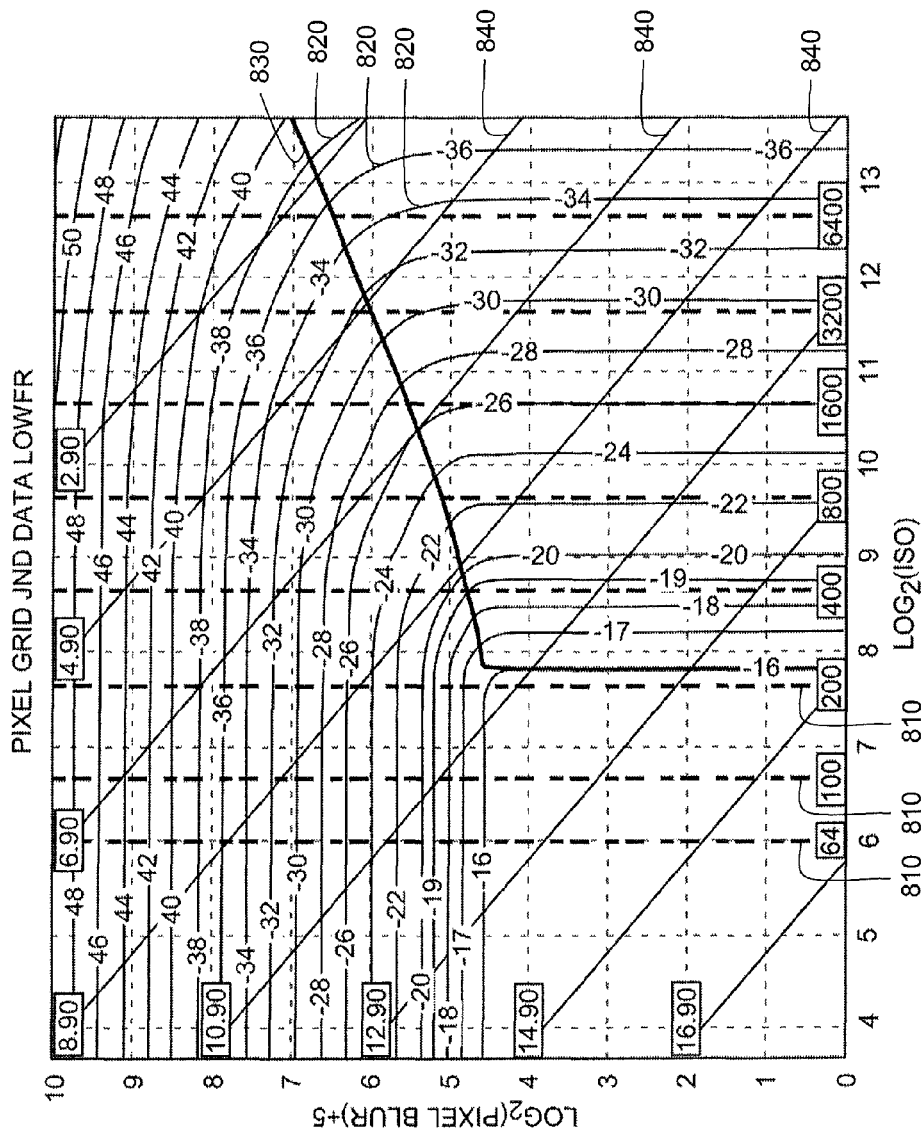
FIG. 8 is a chart showing the effects of ISO and pixel blur on perceived image quality for a 2× binned capture mode.

FIG. 8 is a chart similar to FIG. 6 showing the perceived image quality as a function of ISO and pixel blur for the same digital camera used in the study but in this case operated in a binned capture mode with a 2× binning ratio. The relationship shown in FIG. 8 is similar to that shown in FIG. 6, with some slight differences. In FIG. 8, the ISO lines 810 and the signal ratio lines 840 are in the same relative locations as the corresponding lines in FIG. 6. The effect of the higher base ISO of the sensor produced by binning is immediately apparent in FIG. 8 by the constant perceived image quality lines 820 only going down to slightly above ISO 200 on the X axis. In general, the perceived quality lines 820 are shifted to the right in FIG. 8 compared to the perceived quality lines 620 in FIG. 6. As a result, the curve showing the preferred combination of ISO and pixel blur for a given signal ratio 830 is shifted slightly downward relative to the corresponding curve 630 in FIG. 6.

Figure 9:
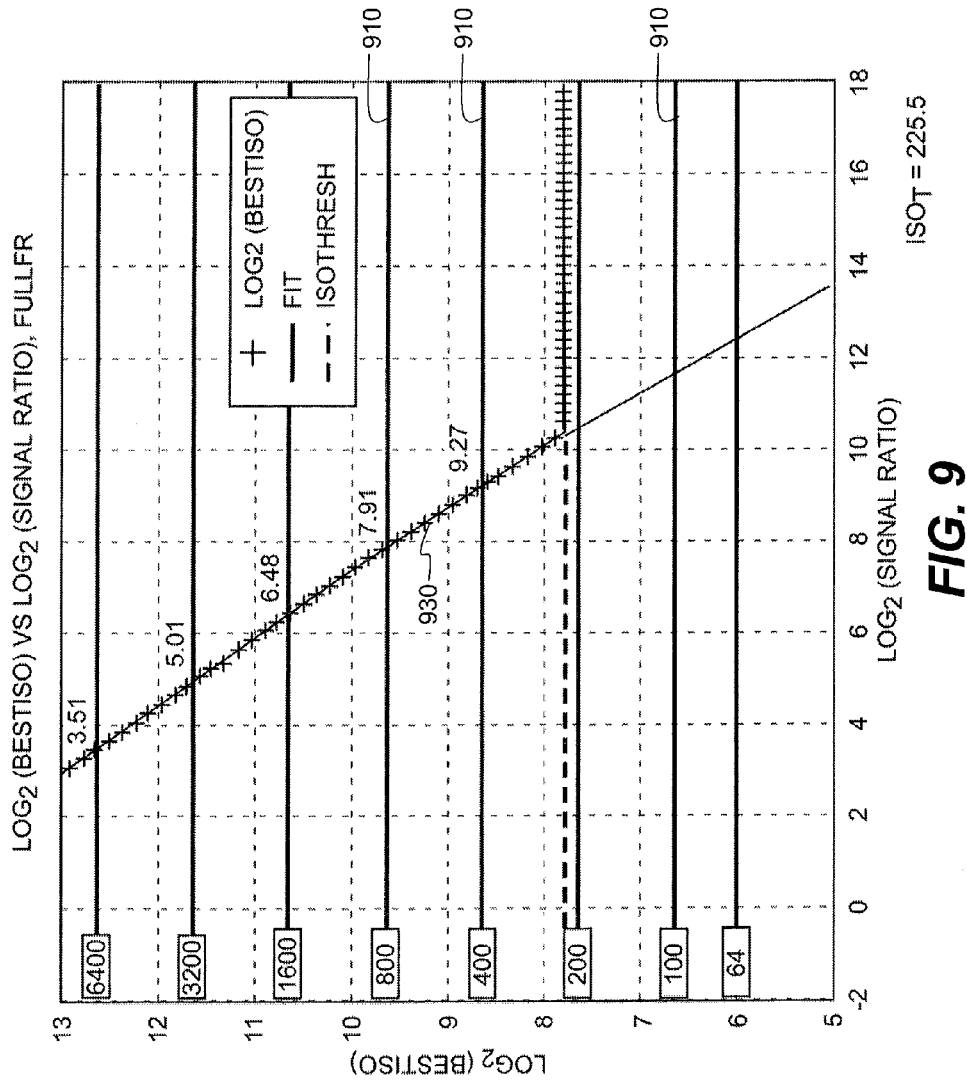
FIG. 9 is a chart showing a relationship between signal ratio and ISO for a 2× binned capture mode for improved perceived image quality.

FIG. 9 is a chart showing a relationship between signal ratio (S/λ) and ISO for the improved image quality curve shown in FIG. 8 using the same digital camera as previously described but now operated in a 2× binned capture mode. While the relationship is similar to that shown in FIG. 7, there are some differences. The constant ISO lines 910 are the same as the ISO lines 710 shown in FIG. 7. The equation describing the sloped line 930 which is the relationship between signal ratio and the ISO to obtain improved perceived image quality is given by Eq. 2 below.

$$Log_2(ISO) = -0.0007418(S/\lambda)^3 + 0.006498(S/\lambda)^2 - 0.68008(S/\lambda) + 14.983 \quad \text{Eq. 2}$$

Figure 10:
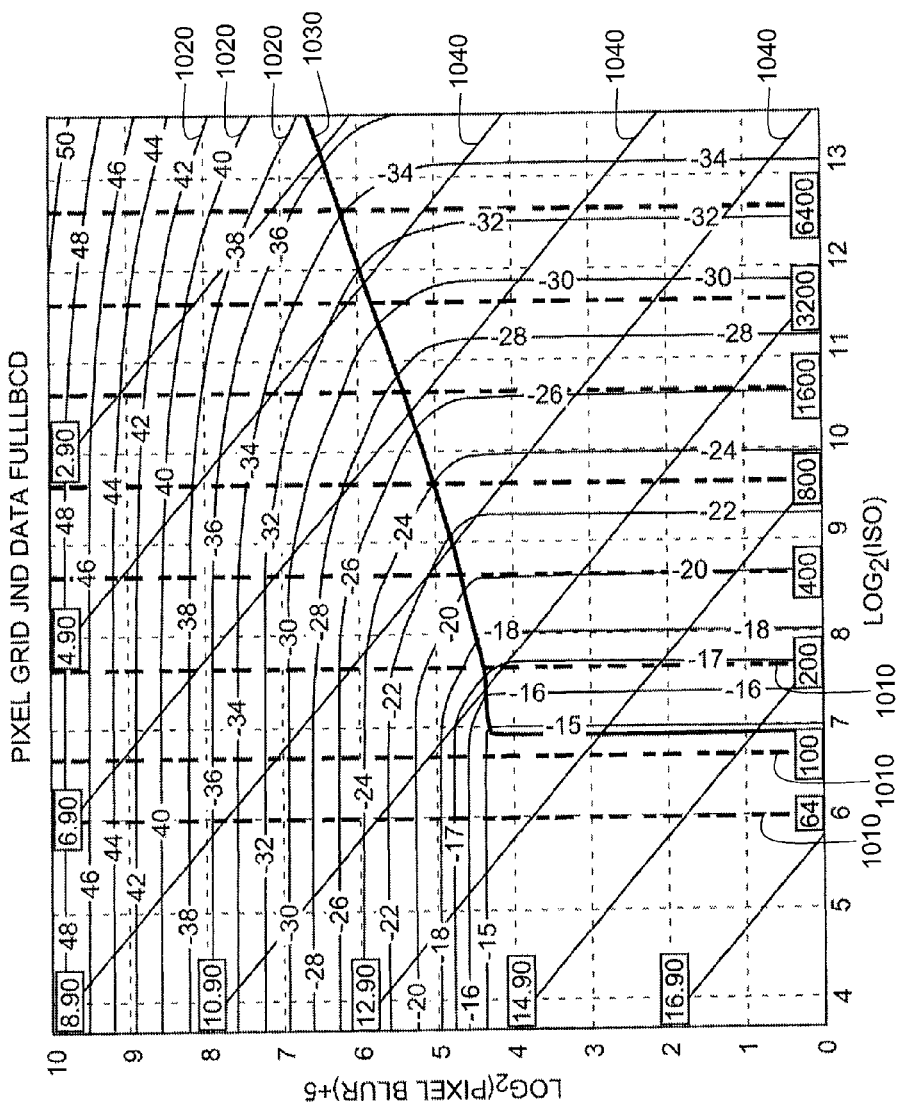
FIG. 10 is a chart showing the effects of ISO and pixel blur on perceived image quality for a multiple image capture mode.
Figure 11:
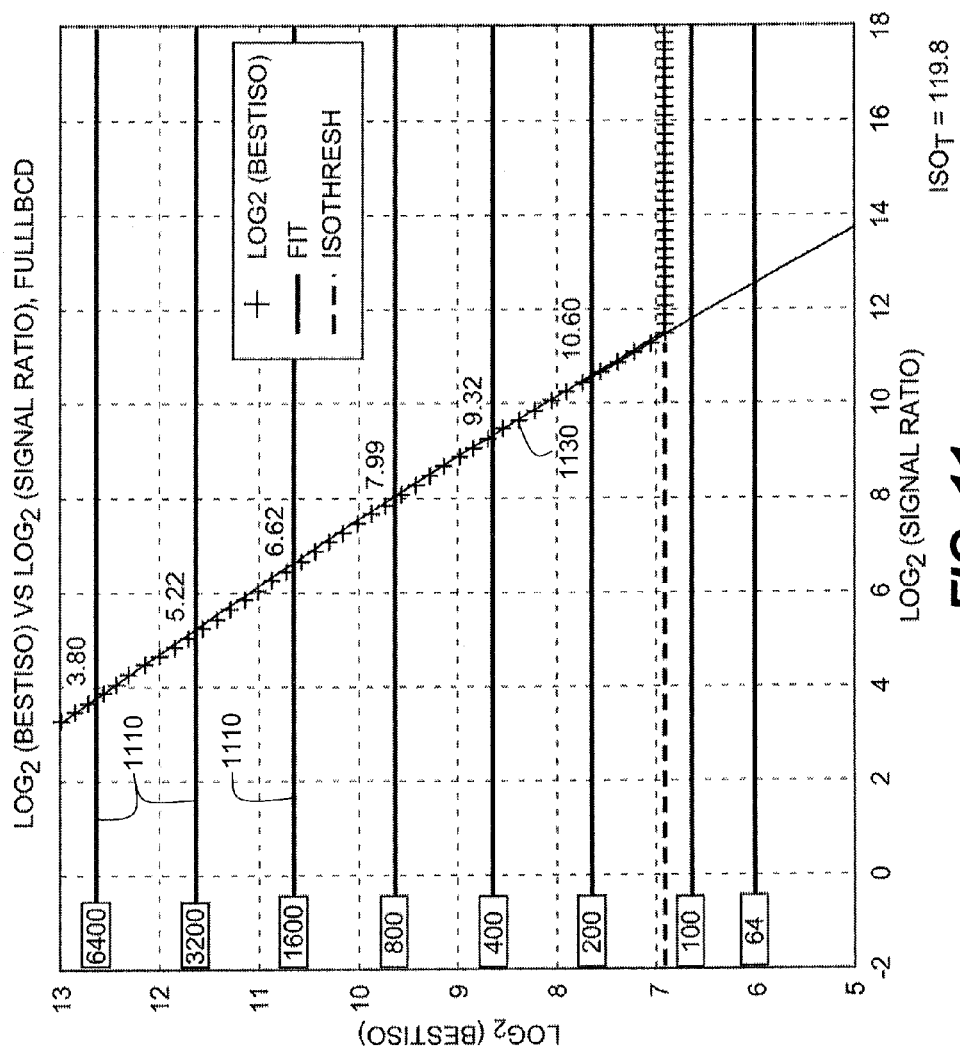
FIG. 11 is a chart showing a relationship between signal ratio and ISO for a multiple image capture mode for improved perceived image quality.

Similar charts are shown in FIGS. 10 and 11 for the same digital camera of the study but operated in a multiple image capture mode. FIG. 10 is a chart of a relationship between ISO and pixel blur for the same camera operated in a multiple image capture mode. In FIG. 10, the ISO lines 1010 and the signal ratio lines 1040 are in the same relative locations as the corresponding lines in FIGS. 6 and 8. The impact of the lower base ISO for this operating mode can be seen in the lines of constant perceived image quality 1020 going down to approximately ISO 100. In general, the perceived quality lines 1020 are shifted to the right in FIG. 10 compared to the perceived quality lines 620 and 820 shown respectively in FIGS. 6 and 8. As a result, the curve showing the preferred combination of ISO and pixel blur for a given signal ratio 1030 is shifted further downward relative to the corresponding curves 630 and 830 shown respectively in FIGS. 6 and 8.

FIG. 11 is a chart of a relationship between signal ratio and ISO for improved perceived image quality for the multiple image capture mode shown in FIG. 10. The constant ISO lines 1110 are shown in the same relative position as those in FIGS. 7 and 9. In this mode the base ISO of the sensor is 119.8. The equation describing the sloped line 1130 which is the ISO for improved perceived image quality is given as Eq. 3 below.

$$\text{Log}_2(\text{ISO}) = -0.000612(S/\lambda)^3 + 0.00616(S/\lambda)^2 - 0.7224(S/\lambda) + 15.336 \quad \text{Eq. 3}$$

Returning to FIG. 3, the invention provides a method that utilizes the determined pixel signal S, the determined pixel velocity λ and the signal ratio of pixel signal/pixel velocity (S/λ) to select the capture mode and capture conditions that provide an improved perceived image quality by utilizing the data shown in FIGS. 4-11. In step 350 the determined value of signal ratio (S/λ) is used with the data presented in FIG. 5 to select a capture mode. Wherein the data of FIG. 5 can be presented in the form of a lookup table that defines the shift points 510 which determine the areas of photographic space as defined by signal ratio (S/λ) where different capture modes provide higher perceived image quality. In Step 360, the determined value of signal ratio (S/λ) is used in Eq. 1 or the data in FIG. 7 for a full resolution capture, to select the ISO to be used for capture of an image. If a 2× binned capture mode or a multiple image capture mode was selected in Step 350, then in Step 360 the data used to select ISO would be that found in Eq. 2 or FIG. 9, or Eq. 3 or FIG. 11 respectively.

Then, in Step 370, the selected ISO and scene brightness L is used in Eq. 4 to select a value for a motion adjusted exposure time $t_{em}$.

$$t_{em} = K/(\text{ISO} \times L) \quad \text{Eq. 4}$$

where L is presented in terms of lux and K is a constant value related to the lens and other aspects of the image capture device.

Again, if a 2× binned capture mode or a multiple image capture mode was selected in Step 350, then in Step 370 the ISO data used to select the motion adjusted exposure time $t_{em}$ would be that found from Eq. 2 or FIG. 9, or Eq. 3 or FIG. 11 respectively.

Finally in Step 380, the selected capture conditions including capture mode, ISO and exposure time are used to capture an archival image which is then stored in an appropriate memory such as system memory 72b or memory card 72c or transmitted to another memory in a remote location. Thus the method of the invention uses measurements of brightness and motion to select a capture mode, ISO and exposure time that reflect the relative balance between brightness and motion and the impact on perceived image quality.

Comparing Eq. 1 to Eq. 2 and Eq. 3, shows that the operating mode of the digital camera does not drastically affect the relationship between signal ratio and ISO for improved perceived image quality. The relationships indicated by Eqs. 1, 2 and 3 are quite similar in nature with only small changes in coefficients. In all three operating modes that were investigated, the use of signal ratio to select ISO and then exposure time provides an improved perceived image quality compared to a typical PRIOR ART auto-exposure system which selects exposure time based on standard modes and scene brightness alone.

Those skilled in the art will recognize that the specific data set presented in FIGS. 4-11 and characterized in the multi-dimensional model represented by Eqs. 1-3 and FIG. 5 present a model of a digital camera operating in several different capture modes. It is expected that other models of digital cameras or other types of image capture devices will have slightly different data sets along with slightly different multi-dimensional models which are similar to the relationships described previously. In particular, changes to the image sensor 18 and the lens 16 (and optical image stabilization) or the electronic image capture unit 14 and associated image processing techniques will cause a shift in the relationship between ISO and perceived image quality. However, the relationship between pixel blur and perceived image quality is broadly applicable. In any case, the method of the invention wherein capture mode, exposure time and ISO are selected based on pixel velocity and signal rate (or signal ratio) is broadly applicable to digital image capture devices.

EXAMPLES

In a typical PRIOR ART digital camera when preparing to capture a single still image, exposure time and ISO are chosen by the auto-exposure control based on average brightness and capture mode where capture mode is selected based on an analysis of brightness distribution in the preview images or an operator selection of capture mode. Binning ratio is selected in combination with ISO. Motion is not measured or taken into account when selecting exposure time, ISO or capture mode. Signal ratio (S/λ) is not calculated.

Figure 13:
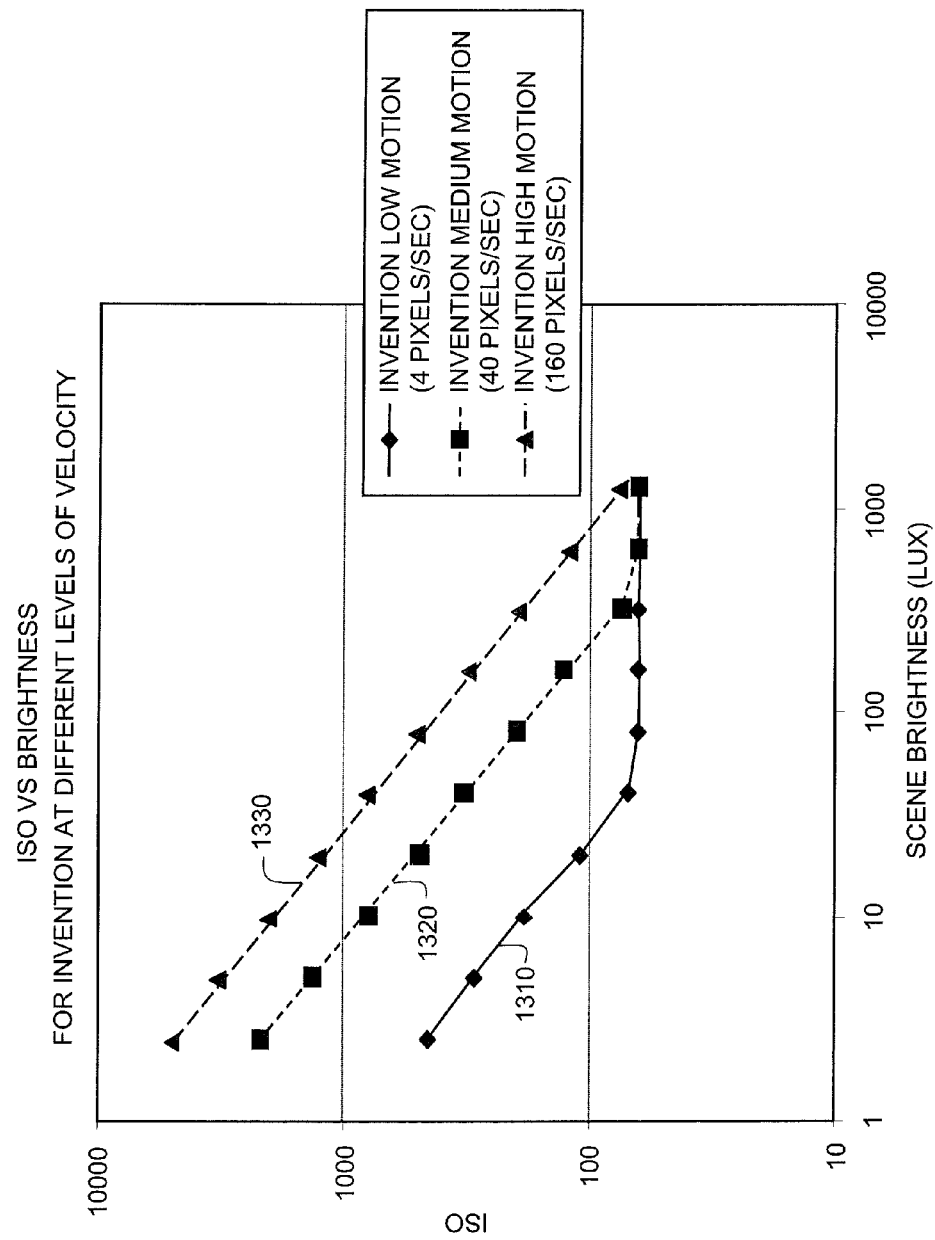
FIG. 13 is a chart showing the ISO selected by the method of the invention for different levels of scene brightness and different levels of motion.

FIG. 13 shows the selection of ISO for different levels of scene brightness and different levels of motion for an image capture device utilizing the method of the invention. The three levels of motion utilized and their corresponding pixel velocities are: low motion (4 pixels/sec velocity), medium motion (40 pixels/sec velocity and high motion (160 pixels/sec velocity). The influence of both brightness and motion can be clearly seen in the selection of ISO as shown by the different ISO curves for the different levels of motion in FIG. 13 as shown by the ISO curves 1310, 1320 and 1330 for respective conditions of low motion, medium motion and high motion. At high levels of scene brightness, ISO is kept very low for all motion conditions. Conditions of low motion as shown by ISO curve 1310 result in the selection of a substantially lower ISO than conditions of high motion as shown by ISO curve 1330. It should be noted that the ISO of the sensor can only be decreased down to the base ISO of the sensor, as a result, the ISO curves form a flat region at approximately 64 for all three ISO curves (1310, 1320, 1330) in the example of FIG. 13, if the sensor could be run at a lower ISO, the control system of the invention would utilize lower ISO settings. As the scene becomes dimmer, the selected ISO is steadily increased, eventually reaching a high level. If low motion is present, the ISO is kept at the base ISO down to 50 lux before the ISO is increased as shown by ISO curve 1310. In contrast, if high motion is present, ISO is increased continuously throughout the range of the tests as shown by ISO curve 1330.

Figure 14:
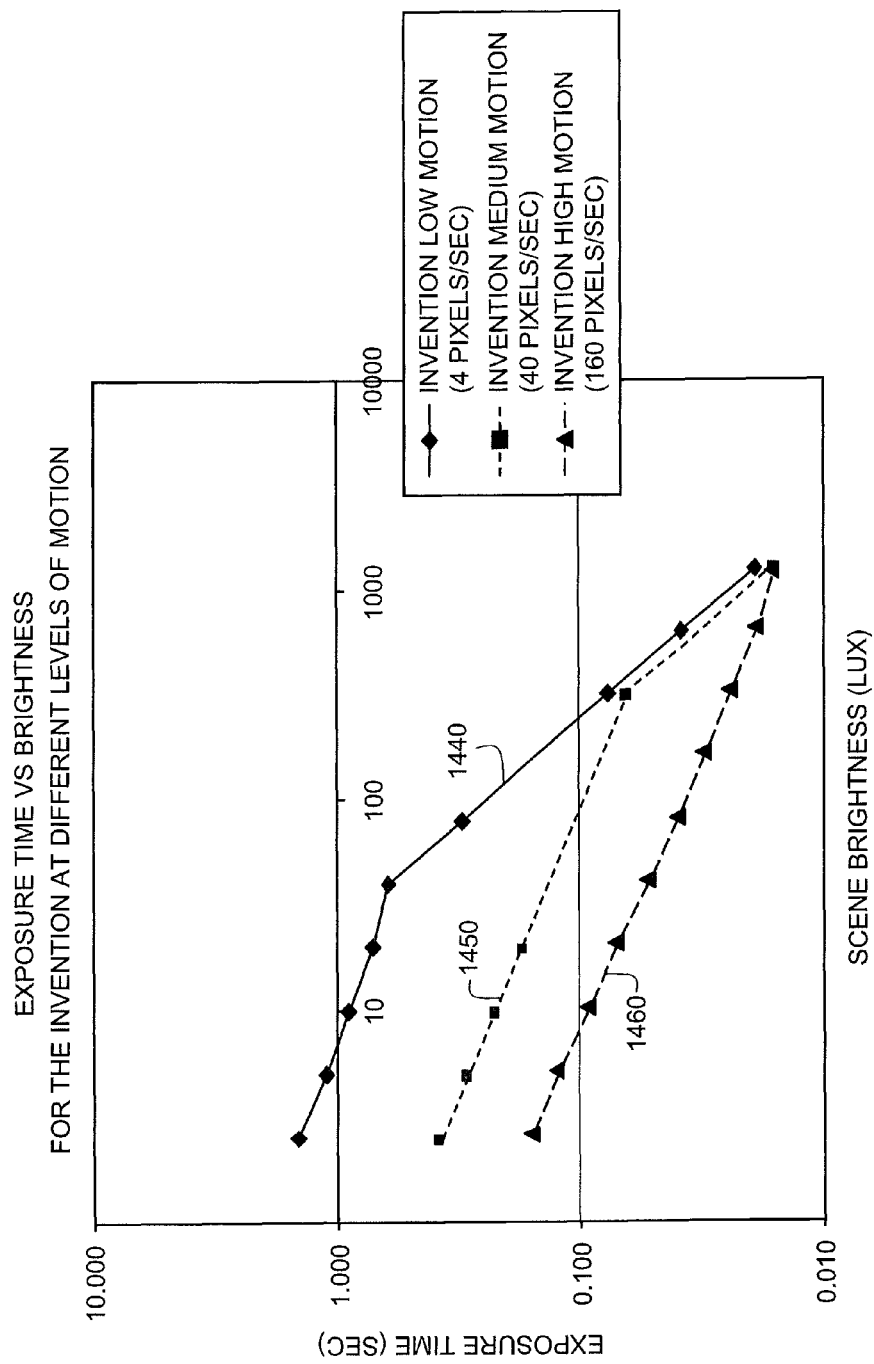
FIG. 14 is a chart showing the exposure time selected by the method of the invention for different levels of scene brightness and different levels of motion.

In FIG. 14, the selection of exposure time for an image capture device utilizing the method of the invention is shown for different levels of scene brightness and different levels of motion. Exposure curves 1440, 1450 and 1460 are shown in FIG. 14 for the same respective levels of low motion, medium motion and high motion as shown for the ISO curves in FIG. 13. At high levels of scene brightness, a short exposure time is selected for all the levels of motion shown. As the scene brightness decreases, the exposure time is increased. As presented in the method of the invention, higher levels of motion as shown by exposure curve 1460 result in lower exposure times compared to exposure curves 1450 and 1440.

Taking together FIGS. 13 and 14 demonstrates that the selection of ISO and exposure time are integrated and responsive to the motion present in the method of the invention. The case of low motion shows how as scene brightness increases, that initially both ISO and exposure time are decreased together in the manner of the invention, however, when the ISO reaches the base ISO of the sensor, it is no longer possible to decrease ISO. As a result, the slopes of the ISO curve 1310 and the exposure curve 1440 change for low motion and scene brightness above 50 lux. Similarly for the case of medium motion, the slopes of the ISO curve 1320 and the exposure curve 1450 change at approximately 500 lux. The method of the invention measures the motion present and then selects the ISO and exposure time in an integrated fashion so that higher perceived image quality is produced in the captured image. FIGS. 13 and 14 show that selected values of ISO and exposure time for different levels of scene brightness are very different for different levels of motion.

Because the typical PRIOR ART camera control does not measure motion or take motion into account when selecting capture mode, ISO or exposure time, the PRIOR ART camera tends to capture images with a lower perceived image quality compared to images captured with the method of the invention. At low levels of motion where motion blur is not an issue, the invention selects longer exposure times and lower ISO than the typical PRIOR ART camera control to capture an image with lower noise. Conversely, at high levels of motion where motion blur is a big issue, the invention selects shorter exposure times and higher ISO than the typical PRIOR ART camera control to capture and image with reduced motion blur. The ability of the method of the invention to adapt the capture conditions to the characteristics of the scene including motion and scene brightness is an important feature of the invention that enables images to be captured with improved perceived image quality.

The invention has been described in detail with particular reference to certain preferred embodiments thereof, but it will be understood that variations and modifications are effected within the spirit and scope of the invention.

PARTS LIST

10 Digital camera
14 Electronic image capture unit
16 Lens
18 Image sensor
20 Optical path
22 Shutter
24 Timing generator
26 Filter assembly
28 Aperture
44 Optical system
48 Image display
50 Zoom control
52 Macro control
54 Focus control
56 Range finder
58 Brightness sensor
60 Flash system
61 Flash
62 Flash sensor
63 Flash control
64 Display controller
65 Control unit
66 System controller
68 Analog signal processor
70 Digital signal processor
72a Digital signal processor memory
72b System memory
72c Memory card
72d Program memory
74 Status display
76 Viewfinder display
78 Orientation sensor
80 Analog to digital converter (A/D)
81 Data bus
82 Socket
83 Memory card interface
84 Host interface
86 Video encoder
93 User input controls
200 Typical camera control flow chart
210 Assess scene brightness step
220 Determine capture mode step
230 Determine ISO step
240 Determine exposure time step
250 Capture archival image step
270 Capture image step
275 Analyze image step
272 Capture additional image step
280 Image quality check step
282 Set exposure parameters step
285 Construct final image step
290 Flow chart of PRIOR ART with multiple image captures
300 Flow chart
310 Gather pre-capture data step
320 Determine brightness and motion step
330 Determine pixel velocity step
340 Determine pixel signal rate step
345 Calculate signal ratio step
350 Select ISO step
360 Select exposure time step
370 Select capture mode step
380 Capture archival image step
510 Shift points between capture modes
610 Constant ISO lines
620 Constant perceived image quality contour lines
630 Relationship for improved perceived image quality
640 Constant signal ratio lines
710 Constant ISO lines
730 Sloped line
810 Constant ISO lines
820 Constant perceived image quality contour lines
830 Relationship for improved perceived image quality
840 Constant signal ratio lines
910 Constant ISO lines
930 Sloped line
1010 Constant ISO lines
1020 Constant perceived image quality contour lines
1030 Relationship for improved perceived image quality
1040 Constant signal ratio lines
1110 Constant ISO lines
1130 Sloped line
1310 ISO curve for low motion
1320 ISO curve for medium motion
1330 ISO curve for high motion
1440 Exposure curve for low motion 1450 Exposure curve for medium motion
1460 Exposure curve for high motion

The invention claimed is:

1. A method for capturing an improved archival image, comprising:
   capturing at least two preview images of a scene with an image capture device;
   determining the scene's brightness;
   determining the scene's motion;
   determining, with a signal processor, a pixel signal rate based at least in part on the scene's brightness, the pixel signal rate having units of charge-per-unit-time;
   determining a scene pixel velocity;
   determining a signal ratio equal to the pixel signal rate divided by the scene pixel velocity; and
   using the signal ratio to select a capture mode for capturing an archival image.

2. A method for capturing an archival image, using an image capture device with selectable capture modes, ISO and exposure time comprising the steps of:
   using an image capture device to capture at least two preview images of a scene;
   using a signal processor for:
      analyzing the preview images to determine scene brightness and motion in the scene;
      determining a pixel signal rate based on the scene brightness and having units of charge-per-unit-time;
      determining a pixel velocity based on the motion in the scene;
      determining a signal ratio equal to the pixel signal rate divided by the pixel velocity;
      selecting a capture mode in accordance with the signal ratio;
      selecting an ISO in accordance with the capture mode and the signal ratio; and
      selecting an exposure time in accordance with the ISO and the scene brightness; and
   using the image capture device to capture an archival image with the selected capture mode, the ISO and the exposure time and causing storage of the archival image into a memory.

3. The method of claim 2 wherein the analyzing step includes comparing the at least two preview images with respect to each other to determine global motion or local motion.

4. The method of claim 3 wherein the pixel velocity is determined from the global motion.

5. The method of claim 3 wherein the pixel velocity is determined from an analysis of the local motion.

6. The method of claim 5 wherein the pixel velocity is determined from an average local motion.

7. The method of claim 5 wherein the pixel velocity is determined from a peak local motion.

8. The method of claim 3 wherein the image capture device includes an inertial measurement device and the global motion is determined with the inertial measuring device.

9. The method of claim 2 wherein the image capture device includes a brightness sensor and the scene brightness is determined with the brightness sensor.

10. The method of claim 2 further comprising using global or local motion determined from the at least two preview images and the determined scene brightness to select the capture mode, the ISO and the exposure time.

11. The method of claim 2 further comprising using a multi-dimensional model to select the capture mode, the ISO and the exposure time in accordance with the signal ratio and the scene brightness.

12. The method of claim 2 wherein the selecting the capture mode step includes selecting a binning ratio.

13. The method of claim 2 wherein the selecting the capture mode step includes selecting a single capture mode or a multiple capture mode.

14. A method for capturing an archival image, using an image capture device with an inertial measurement device, selectable capture modes, ISO and exposure time comprising the steps of:
   determining global motion of an image capture device with an inertial measurement device;
   converting the global motion of the image capture device to a pixel velocity;
   determining scene brightness based on two or more preview images of the scene;
   determining, with a signal processor, a pixel signal rate, having units of charge-per-unit-time, based on the scene brightness;
   determining a signal ratio equal to the pixel signal rate divided by the pixel velocity;
   selecting a capture mode in accordance with the signal ratio;
   selecting an ISO in accordance with the signal ratio;
   selecting an exposure time in accordance with the ISO and the scene brightness; and
   using the image capture device to capture the archival image with the selected capture mode, the ISO and the exposure time and causing the archival image to be stored in memory.

15. The method of claim 14 wherein the determining scene brightness step includes analyzing the two or more preview images for the scene brightness.

16. A non-transitory program storage device comprising instructions stored thereon to cause one or more processors to:
   capture at least two preview images of a scene with an image capture device;
   determine the scene's brightness;
   determine the scene's motion;
   determine a pixel signal rate based at least in part on the scene's brightness, the pixel signal rate having units of charge-per-unit-time;
   determine a scene pixel velocity;
   determine a signal ratio equal to the pixel signal rate divided by the scene pixel velocity; and
   use the signal ratio to select a capture mode for capturing the archival image.

17. The non-transitory program storage device of claim 16, further comprising instructions to cause the one or more processors to select an ISO in accordance with the capture mode and the signal ratio.

18. The non-transitory program storage device of claim 17, further comprising instructions to cause the one or more processors to select an exposure time in accordance with the ISO and the scene's brightness.

19. The non-transitory program storage device of claim 18, further comprising instructions to cause the one or more processors to capture an image based on the selected capture mode, the ISO and the exposure time.

* * * * *